United States Patent
Moon et al.

(10) Patent No.: US 11,644,932 B2
(45) Date of Patent: May 9, 2023

(54) DISPLAY DEVICE HAVING TOUCH SENSING STRUCTURE INCLUDING GUARD LINE

(71) Applicant: Samsung Display Co., Ltd., Yongin-si (KR)

(72) Inventors: Dong Jin Moon, Cheonan-si (KR); Young Bae Jung, Cheonan-si (KR); Ye Ri Jeong, Suwon-si (KR); In Young Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/783,090

(22) Filed: Feb. 5, 2020

(65) Prior Publication Data
US 2020/0401274 A1    Dec. 24, 2020

(30) Foreign Application Priority Data
Jun. 20, 2019   (KR) .......................... 10-2019-0073594

(51) Int. Cl.
G06F 3/044      (2006.01)
G06F 3/045      (2006.01)

(52) U.S. Cl.
CPC ............ *G06F 3/0445* (2019.05); *G06F 3/045* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 10,209,826 B2 | 2/2019 | Ono et al. | |
| 2012/0062485 A1 | 3/2012 | Kim | |
| 2012/0306776 A1* | 12/2012 | Kim | G06F 3/0446 345/173 |
| 2013/0106747 A1* | 5/2013 | Choi | G06F 3/0446 345/173 |
| 2013/0120312 A1* | 5/2013 | Takahashi | G06F 3/0443 345/174 |

(Continued)

FOREIGN PATENT DOCUMENTS

| | | |
|---|---|---|
| CN | 104461094 | 3/2015 |
| JP | 2016-206867 | 12/2016 |
| KR | 10-2012-0029008 | 3/2012 |

*Primary Examiner* — Roberto W Flores
(74) *Attorney, Agent, or Firm* — H.C. Park & Associates, PLC

(57) ABSTRACT

A display device includes first touch electrodes, first routing lines, second routing lines, and a first guard line. The first touch electrodes are arranged in a touch sensing area. The first routing lines are connected to one side of the first touch electrodes. The second routing lines are connected to another side of the first touch electrodes. The first guard line is between the first routing lines and the second routing lines, and includes a first region extending in a first direction, and a second region extending from one end of the first region in a second direction crossing the first direction. The first region includes a first touch conductive layer, and a second touch conductive layer on the first touch conductive layer. The second region of the first guard line includes the second touch conductive layer and does not overlap the first touch conductive layer.

14 Claims, 28 Drawing Sheets

(56) References Cited

U.S. PATENT DOCUMENTS

| | | | |
|---|---|---|---|
| 2014/0184950 A1* | 7/2014 | Chu | G06F 3/0446 |
| | | | 349/12 |
| 2014/0184952 A1* | 7/2014 | Chu | G06F 3/0446 |
| | | | 349/12 |
| 2015/0015800 A1 | 1/2015 | Yang et al. | |
| 2015/0220193 A1* | 8/2015 | Choe | G06F 3/0443 |
| | | | 345/174 |
| 2016/0103548 A1* | 4/2016 | Jun | G06F 3/0412 |
| | | | 345/173 |
| 2017/0123572 A1* | 5/2017 | Song | G06F 3/0446 |
| 2020/0167038 A1* | 5/2020 | Lee | G06F 3/0448 |
| 2020/0350512 A1* | 11/2020 | Guo | H01L 27/3276 |

* cited by examiner

DISPLAY DEVICE HAVING TOUCH SENSING STRUCTURE INCLUDING GUARD LINE

CROSS-REFERENCE TO RELATED APPLICATION

This application claims priority to and the benefit of Korean Patent Application No. 10-2019-0073594, filed Jun. 20, 2019, which is hereby incorporated by reference for all purposes as if fully set forth herein.

BACKGROUND

Field

Exemplary embodiments generally relate to a display device.

DISCUSSION

A display device for displaying an image may be used in association with various electronic appliances to provide an image to a user, such as smart phones, tablet personal computers (PCs), digital cameras, notebook computers, navigators, televisions, etc. A display device typically includes a display panel for generating and displaying an image and various input devices. For instance, a touch unit, which is a kind of information input device, may be provided and used in conjunction with the display device. A touch sensor may be attached to one surface of a display panel of the display device, or may be integrated with the display panel. A user may input information by, for instance, pressing, touching, approaching, hovering over, etc., the touch unit while viewing an image displayed via a screen of the display device.

A touch unit typically includes a first touch electrode electrically connected in one direction and a second touch electrode electrically connected in another direction crossing the one direction, and may further include a guard line disposed between routing lines respectively connected to the touch electrodes. In this case, electrostatic defects may occur in a part of an area between the routing line and the guard line, and thus, it may be difficult or even impossible to drive the touch unit with the electrostatic defects.

The above information disclosed in this section is only for understanding the background of the inventive concepts, and, therefore, may contain information that does not form prior art.

SUMMARY

Some aspects provide a display device capable of preventing electrostatic defects of a guard line of a touch sensing layer.

Additional aspects will be set forth in the detailed description which follows, and, in part, will be apparent from the disclosure, or may be learned by practice of the inventive concepts.

According to some aspects, a display device includes first touch electrodes, first routing lines, second routing lines, and a first guard line. The first touch electrodes are arranged in a touch sensing area. The first routing lines are connected to one side of the first touch electrodes. The second routing lines are connected to another side of the first touch electrodes. The first guard line is between the first routing lines and the second routing lines. The first guard line includes a first region extending in a first direction, and a second region extending from one end of the first region in a second direction crossing the first direction. The first region of the first guard line includes a first touch conductive layer, and a second touch conductive layer on the first touch conductive layer. The second region of the first guard line includes the second touch conductive layer and does not overlap the first touch conductive layer in a third direction perpendicular to the first and second directions.

According to some aspects, a display device includes first touch electrodes, first routing lines, second routing lines, and a first guard line. The first touch electrodes are arranged in a touch sensing area. The first routing lines are connected to one side of the first touch electrodes. The second routing lines are connected to another side of the first touch electrodes. The first guard line is between the first routing lines and the second routing lines. A distance between the first guard line and a first adjacent first routing line among the first routing lines is greater than a distance between the first guard line and a first adjacent second routing line among the second routing lines.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts. In the drawings.

DETAILED DESCRIPTION OF SOME EXEMPLARY EMBODIMENTS

Figure 1:
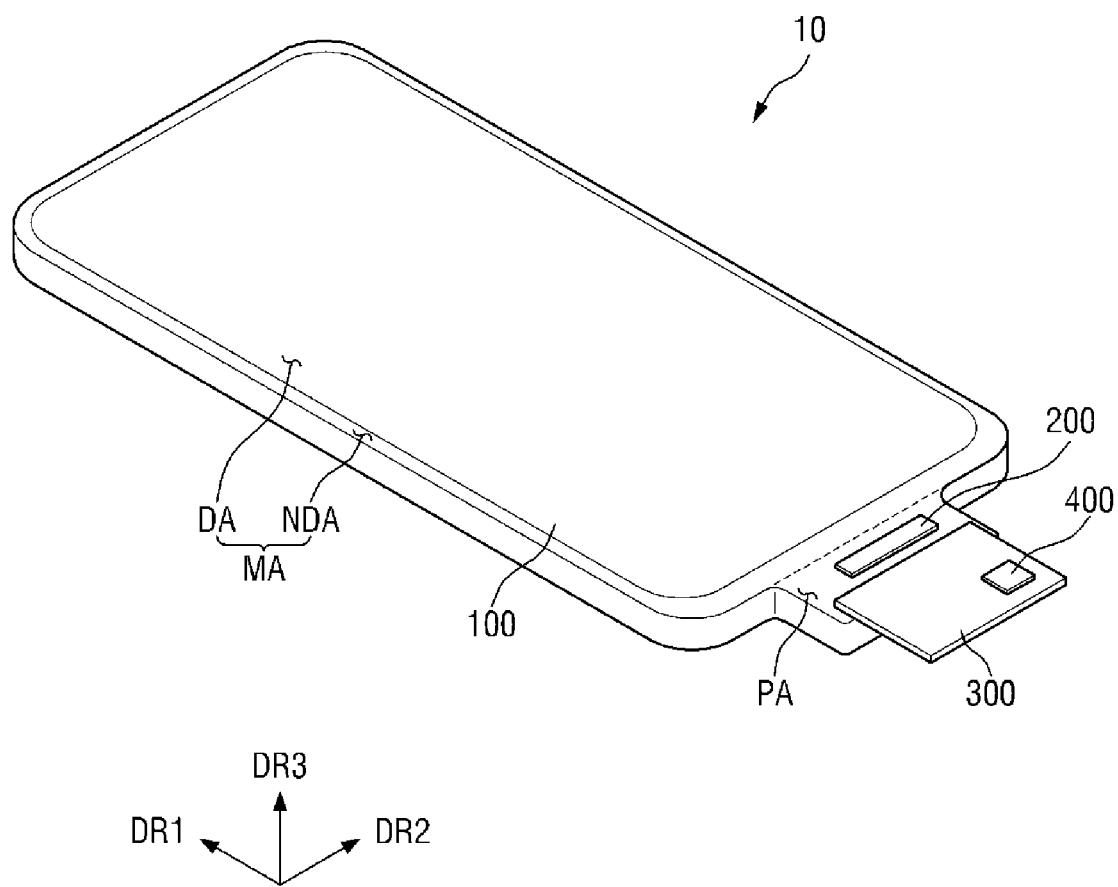
FIG. 1 is a perspective view of a display device according to an exemplary embodiment.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, a first direction DR1 indicates a Y-axis direction, a second direction DR2 indicates an X-axis direction, and a third direction DR3 indicates a Z-axis direction. The X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. Also, for the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

Figure 2:
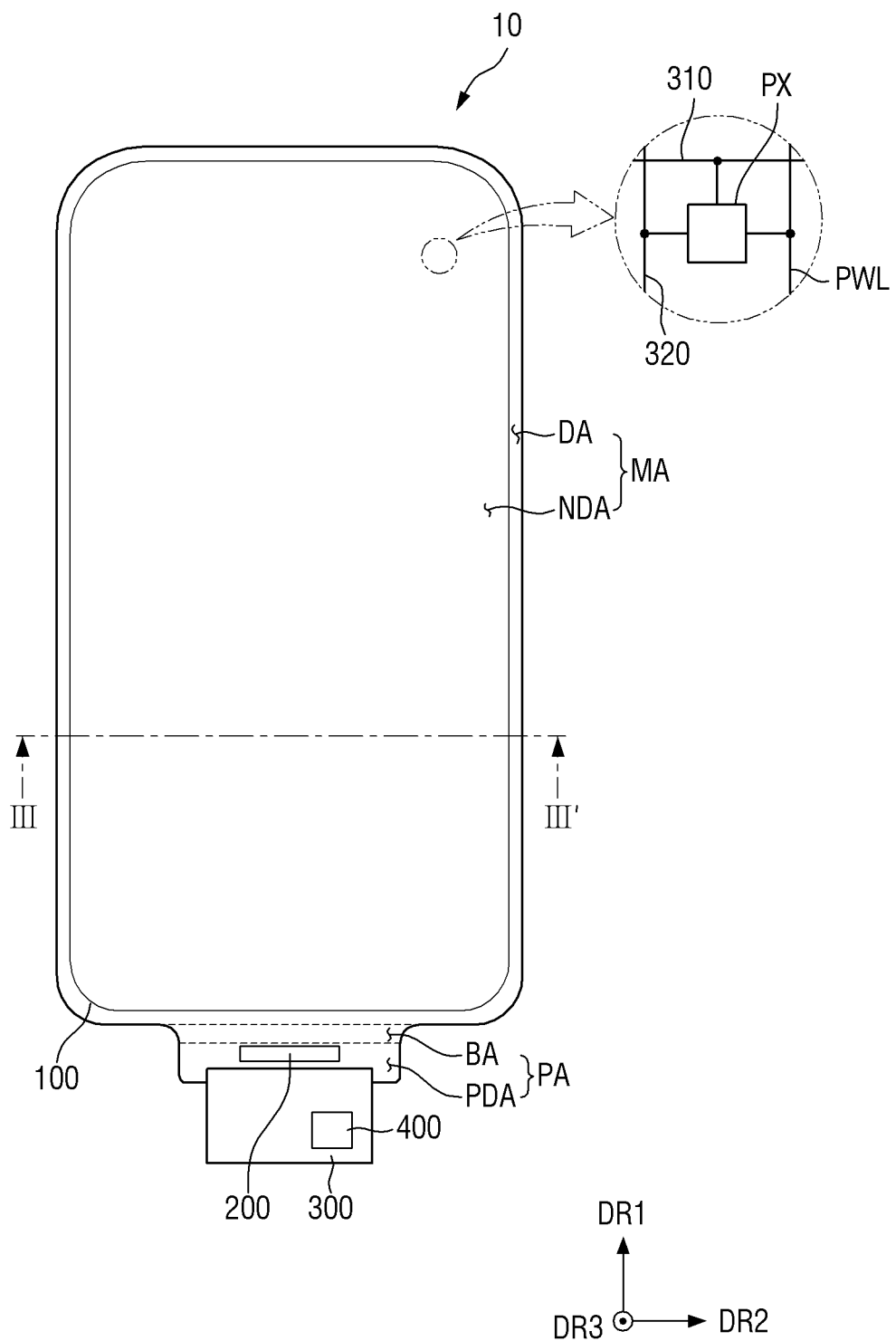
FIG. 2 is a plan view of a display device according to an exemplary embodiment.

FIG. 1 is a perspective view of a display device according to an exemplary embodiment. FIG. 2 is a plan view of a display device according to an exemplary embodiment.

Referring to FIGS. 1 and 2, a display device 10, which is a device for displaying at least one of a moving image and a still image, may be used as a display screen of various products, such as televisions, notebooks, monitors, billboards, internet of things (IOTs) devices, etc., as well as portable electronic appliances, such as mobile phones, smart phones, tablet personal computers (tablet PCs), smart watches, watch phones, mobile communication terminals, electronic notebooks, electronic books, portable multimedia players (PMPs), navigators, ultra-mobile PCs (UMPCs), and the like. The display device 10 may be any one of an organic light emitting display, a liquid crystal display, a plasma display, a field emission display, an electrophoretic display, an electrowetting display, a quantum dot light emitting display, micro LED display, etc. Hereinafter, the display device 10 will be mainly described as an organic light emitting display device for descriptive convenience.

The display device 10 according to an exemplary embodiment includes a display panel 100, a display driving circuit 200, a circuit board 300, and a touch driving circuit 400.

The display panel 100 may include a main area MA and a protrusion area PA protruding from one side of the main area MA.

The main area MA may be formed as a rectangular plane having short sides in the second direction DR2 and long sides in the first direction DR1 crossing the second direction DR2. A corner where the short side in the first direction DR1 meets the long side in the second direction DR2 may be formed to have a round shape of a predetermined curvature or have a right angle shape, or any other suitable configuration.

The main area MA may include a display area DA where pixels are formed to display an image, and a non-display area NDA, which is a peripheral area of the display area DA. The main area MA may be formed flat, but the shape of the main area MA is not limited thereto. The main area MA may include a curved portion formed at, for instance, left and right ends thereof, but exemplary embodiments are not limited thereto.

The display area DA of the main area MA may be provided with scan lines 310, data lines 320, and power supply lines PWL, which are connected to pixels PX, in addition to the pixels PX. When the main area MA includes a curved portion, the display area DA may be disposed on the curved portion. In this case, an image of the display panel 100 may be seen even on the curved portion.

The non-display area NDA may be defined as an area from the outside of the display area DA and may extend to at least one edge of the display panel 100. The non-display area NDA may be provided with a scan driver (not illustrated) for applying scan signals to the scan lines 310 and link lines (not shown) for connecting the data lines 320 to a display driving circuit 200.

The protrusion area PA may protrude from one side of the main area MA. For example, the protrusion area PA may protrude from the lower side of the main area MA as shown in FIGS. 1 and 2. The length (or width) of the protrusion area PA in the second direction DR2 may be smaller than the length of the main area MA in the second direction DR2.

The protrusion area PA may include a bending area BA and a pad area PDA. In this case, the pad area PDA may be disposed at one side of the bending area BA, and the main area MA may be disposed at the other side of the bending area BA.

The display panel 100 may be formed to be flexible so as to be bent, warped, folded, rolled, twisted, or otherwise flexed. Therefore, the display panel 100 may be bent in a thickness direction (e.g., the third direction DR3) in the bending area BA. In this case, one side of the pad area PDA of the display panel 100 faces upward before the display panel 100 is bent, but may face downward after the display panel 100 is bent. Thus, the pad area PDA may be disposed under the main area MA to overlap the main area MA.

A plurality of pads electrically connected to the display driving circuit 200 and the circuit board 300 may be arranged in the pad area PDA of the display panel 100. The plurality of pads may include a display pad electrically connected to the display driving circuit 200 and touch pads electrically connected to a routing line, as will become more apparent below.

The display driving circuit 200 outputs signals and voltages for driving the display panel 100. For example, the display driving circuit 200 may supply data voltages to the data lines 320. Further, the display driving circuit 200 may supply a power supply voltage to the power supply lines PWL, and may supply scan control signals to the scan driver. The display driving circuit 200 may be formed as an integrated circuit (IC), and may be mounted on the pad area PDA of the display panel 100 by a chip-on-glass (COG) bonding method, a chip-on-plastic (COP) bonding method, or an ultrasonic bonding method, but exemplary embodiments are not limited thereto. Alternatively, the display driving circuit 200 may be mounted on the circuit board 300.

The circuit board 300 may be attached onto display electrode pads of the display panel 100 using an anisotropic conductive film. Thus, the lead lines of the circuit board 300 may be electrically connected to the display electrode pads of the display panel 100. The circuit board 300 may be a flexible printed circuit board, a printed circuit board, or a flexible film, such as a chip-on-film (COF).

The touch driving circuit 400 may be disposed on the circuit board 300. The touch driving circuit may be formed as an integrated circuit (IC) and mounted on the circuit board 300.

Figure 3:
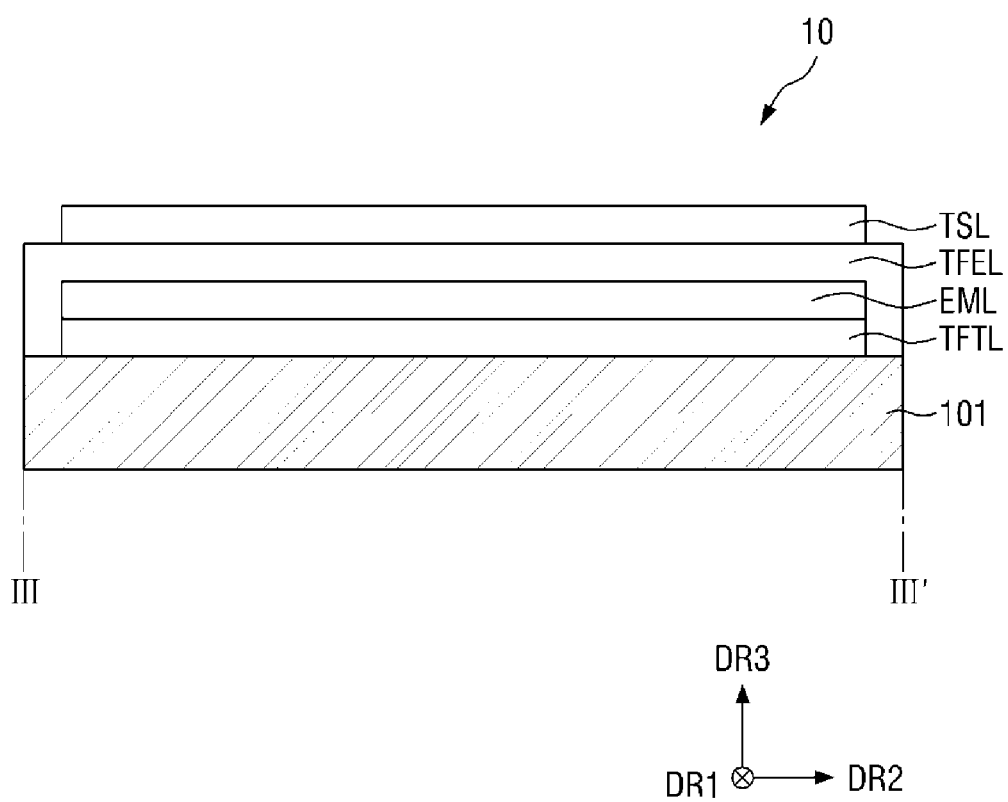
FIG. 3 is a cross-sectional view taken along sectional line of FIG. 2 according to an exemplary embodiment.

Referring to FIG. 3, the display device 10 may include a substrate 101, a thin film transistor layer TFTL, a light emitting element layer EML, a thin film encapsulation layer TFEL, and a touch sensing layer TSL.

The substrate 101 may be a flexible substrate capable of bending, folding, rolling, twisting, or the like. Examples of materials of the substrate 101 may include at least one of polyethersulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), and any combination thereof. The substrate 101 may be a single- or multi-layer structure.

The thin film transistor layer TFTL may be disposed on the substrate 101. Although not shown, the thin film transistor layer TFTL may be provided with the scan lines 310, the data lines 320, the power supply lines PWL, scan control lines, and link lines for connecting the pads and the data lines 310, as well as thin film transistors of respective pixels PX. Each of the thin film transistors may include a gate electrode, a semiconductor layer, a source electrode, and a drain electrode.

The thin film transistor layer TFTL may be disposed in the display area DA and the non-display area NDA. For instance, the thin film transistors of respective pixels PX, the scan lines 310, the data lines 320, and the power supply lines PWL may be arranged in the display area DA. The scan control lines and link lines of the thin film transistor layer TFTL may be arranged in the non-display area NDA.

The light emitting element layer EML may be disposed on the thin film transistor layer TFTL. Although not shown, the light emitting element layer EML may include pixels PX including a first electrode, a light emitting layer, and a second electrode, and a pixel defining film defining the pixels PX. The light emitting layer may be an organic light emitting layer including an organic material. In this case, the light emitting layer may include a hole transporting layer, an organic light emitting layer, and an electron transporting layer. When a predetermined voltage is applied to the first electrode through the thin film transistor of the thin film transistor layer TFTL and a cathode voltage is applied to the second electrode through, for instance, a thin film transistor of the thin film transistor layer TFTL, holes and electrons move to the organic light emitting layer through the hole transporting layer and the electron transporting layer, respectively, and are combined with each other in the organic light emitting layer to emit light. The pixels PX of the light emitting element layer EML may be arranged in the display area DA. An exemplary cross-sectional structure of some pixels PX will be described later with reference to FIG. 7.

The thin film encapsulation layer TFEL may be disposed on the light emitting element layer EML. The thin film encapsulation layer TFEL serves to prevent (or mitigate) oxygen or moisture from penetrating the light emitting element layer EML. For this purpose, the thin film encapsulation layer TFEL may include at least one inorganic film (or layer). The inorganic layer may include at least one of a silicon nitride layer, a silicon oxynitride layer, a silicon oxide layer, a titanium oxide layer, and an aluminum oxide layer, but is not limited thereto. Further, the thin film encapsulation layer TFEL serves to protect the light emitting element layer EML from foreign matter, such as dust. For this purpose, the thin film encapsulation layer TFEL may include at least one organic film. The organic film may be made of at least one of acryl resin, epoxy resin, phenol resin, polyamide resin, and polyimide resin, but the material of the at least one organic film is not limited thereto.

The thin film encapsulation layer TFEL may be disposed in both the display area DA and the non-display area NDA. For instance, the thin film encapsulation layer TFEL may be disposed to cover the light emitting element layer EML of the display area DA and the non-display area NDA and cover the thin film transistor layer TFTL of the non-display area NDA.

The touch sensing layer TSL may be disposed on the thin film encapsulation layer TFEL. When the touch sensing layer TSL is disposed directly on the thin film encapsulation layer TFEL, the thickness of the display device 10 may be reduced as compared to when a separate touch panel including the touch sensing layer TSL is attached onto the thin film encapsulation layer TFEL using, for instance, an adhesive layer.

The touch sensing layer TSL may include a plurality of touch electrodes for sensing a user's touch (or touch interaction) in a capacitance method and routing lines for connecting pads and touch electrodes. For example, the touch sensing layer TSL may sense a user's touch in a self-capacitance method or a mutual capacitance method.

A cover window (not shown) may be additionally disposed on the touch sensing layer TSL, and in this case, the touch sensing layer TSL and the cover window may be attached to each other by a transparent adhesive member. Hereinafter, the touch sensing layer TSL will be described in more detail.

Figure 4:
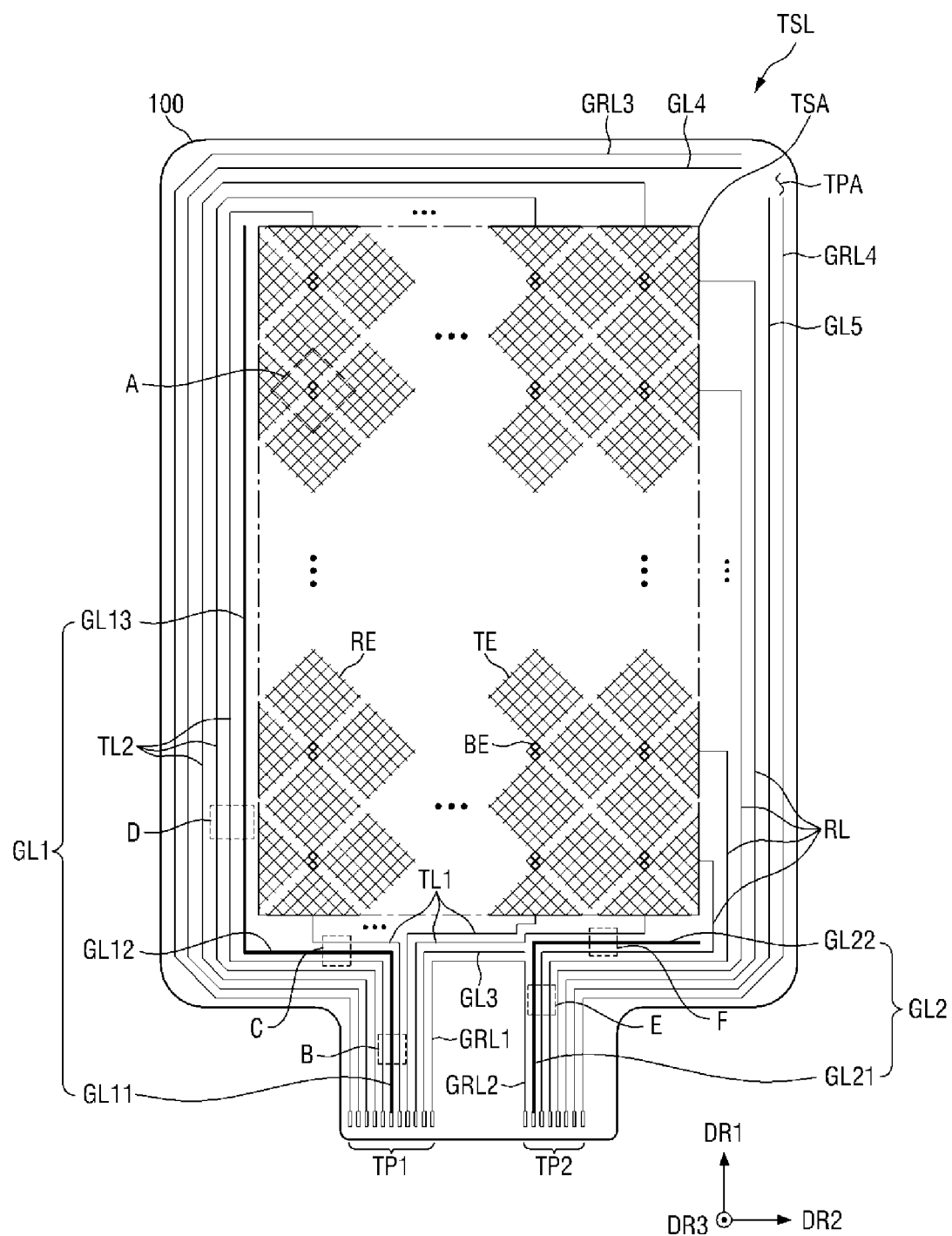
FIG. 4 is a plan view of the touch sensing layer of FIG. 3 according to an exemplary embodiment.
Figure 5:
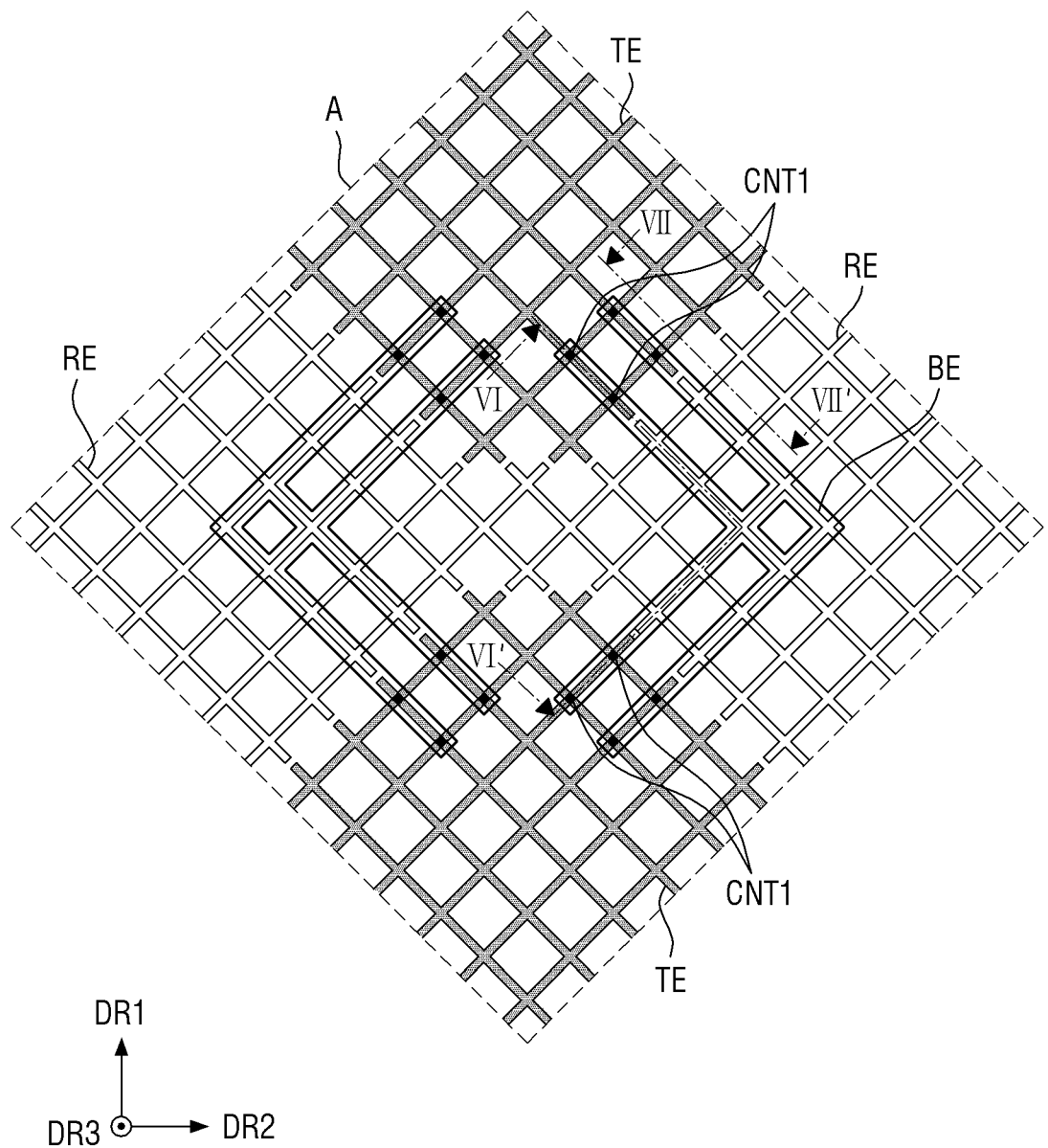
FIG. 5 is an enlarged view of area A of FIG. 4 according to an exemplary embodiment.
Figure 6:
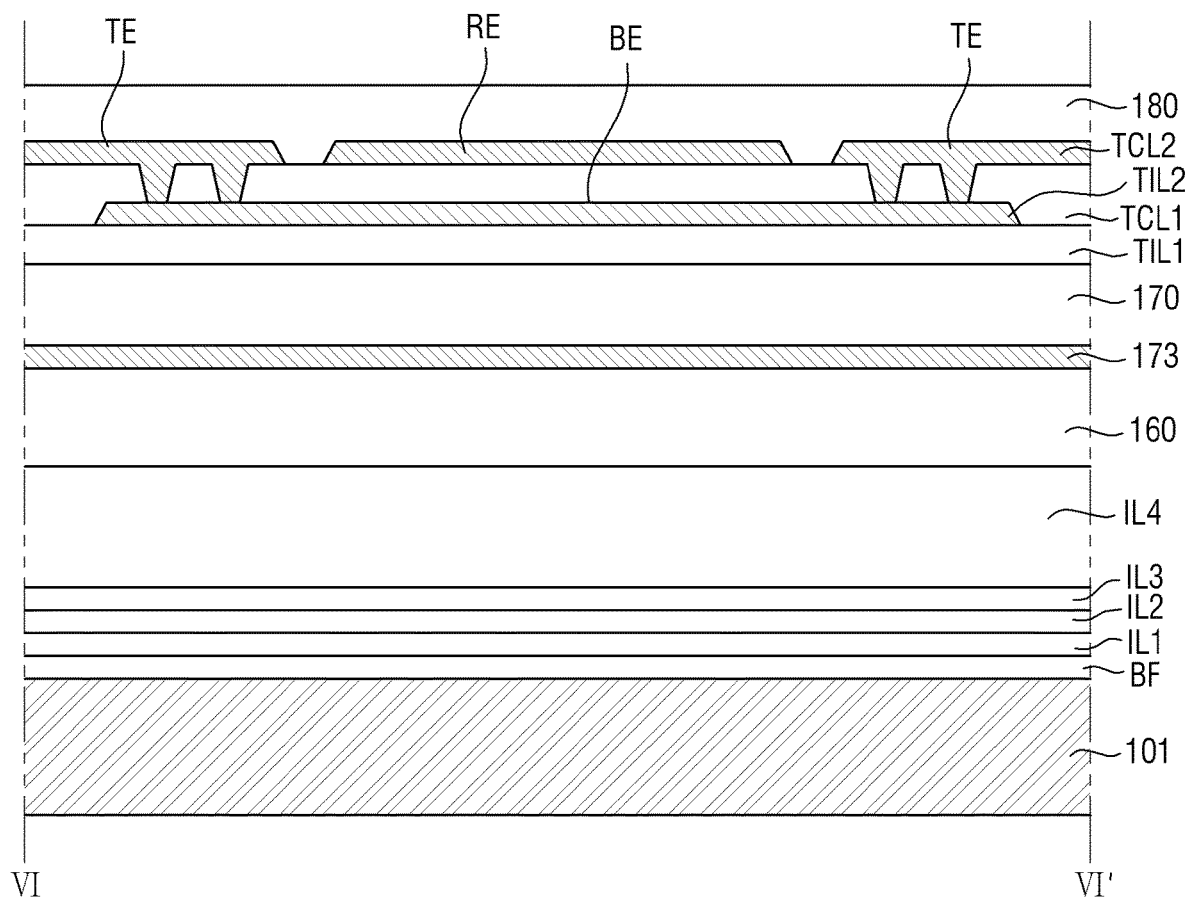
FIG. 6 is a cross-sectional view taken along sectional line VI-VI' of FIG. 5 according to an exemplary embodiment.
Figure 7:
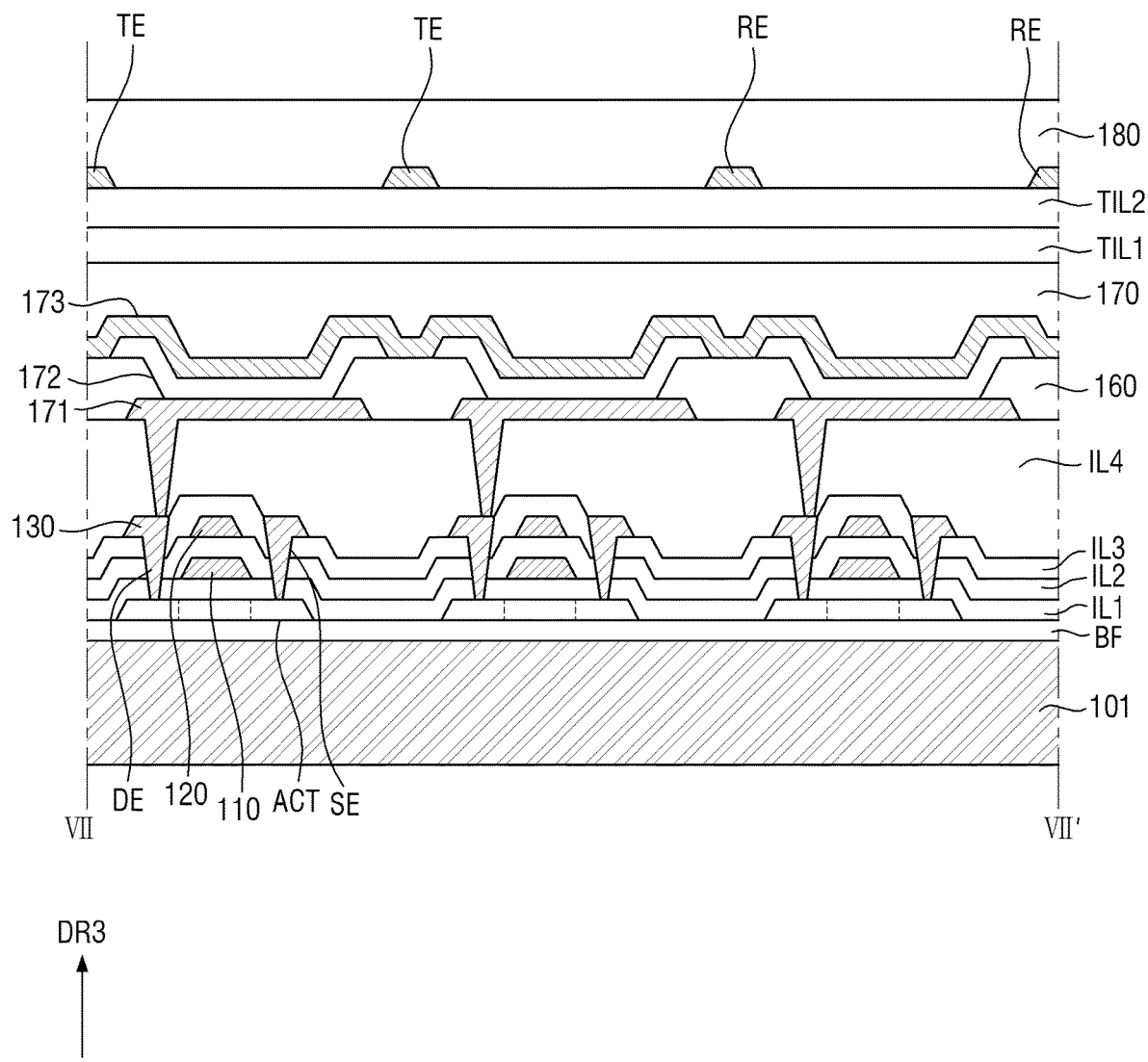
FIG. 7 is a cross-sectional view taken along sectional line VII-VII' of FIG. 5 according to an exemplary embodiment.

FIG. 4 is a plan view of the touch sensing layer of FIG. 3 according to an exemplary embodiment. FIG. 5 is an enlarged view of area A of FIG. 4 according to an exemplary embodiment. FIG. 6 is a cross-sectional view taken along sectional line VI-VI' of FIG. 5 according to an exemplary embodiment. FIG. 7 is a cross-sectional view taken along sectional line VII-VII' of FIG. 5 according to an exemplary embodiment.

Referring to FIGS. 4 to 7, the touch sensing layer TSL includes a touch sensing area TSA for sensing a user's touch and a touch peripheral area TPA disposed around the touch sensing area TSA.

The touch sensing area TSA may overlap the display area DA. The touch sensing area TSA may be provided with a plurality of first touch electrodes TE, a plurality of second touch electrodes RE, and a plurality of connection electrodes BE. The first touch electrodes TE and the second touch electrodes RE may be arranged to be spaced apart from each other.

The plurality of first touch electrodes TE may be arranged in a plurality of columns along the first direction DR1, and the plurality of second touch electrodes RE may be arranged in a plurality of rows along the second direction DR2. In each of the columns, the first touch electrodes TE disposed along the first direction DR1 may be electrically connected to each other. In each of the rows, the second touch electrodes RE disposed along the second direction DR2 may be electrically connected to each other.

The first touch electrode TE and the second touch electrode RE may be formed in a diamond shape or a triangle shape on a plane, but exemplary embodiments are not limited thereto. For instance, the first touch electrode TE and the second touch electrode RE disposed at the edge of the touch sensing area TSA may be formed in a triangular shape on a plane, and other first touch electrodes TE and other second touch electrodes RE may be formed in a diamond shape on a plane.

The first touch electrode TE and the second touch electrode RE may be formed as a mesh-shaped electrode as shown in FIG. 5. When the touch sensing layer TSL including the first touch electrodes TE and the second touch electrodes RE is formed directly on the thin film encapsulation film TFEL, the distance between the second electrode of the light emitting element layer EML and the first touch electrodes TE or the second touch electrodes RE of the touch sensing layer TSL is close such that parasitic capacitance may be formed (e.g., greatly formed) between the second electrode of the light emitting element layer EML and the first touch electrode TE or the second touch electrode RE of the touch sensing layer TSL. Accordingly, to reduce the parasitic capacitance, the first touch electrodes TE and the second touch electrodes RE may be formed as a mesh-shaped electrode as shown in FIG. 5, rather than being formed as a non-patterned electrode of a transparent conductive oxide conductive layer, such as indium-tin-oxide (ITO) or indium-zinc-oxide (IZO).

Further, the first touch electrode TE and the second touch electrode RE overlap the pixel defining film 160. Thus, the opening area of the pixels PX can be prevented from being reduced.

The plurality of first touch electrodes TE and the plurality of second touch electrodes RE may be spaced apart from each other, and the first touch electrodes TE adjacent to each other in the first direction DR1 may be electrically connected through the connection electrode BE. In this case, the first touch electrode TE and the second touch electrode RE may be disposed on the same layer, and the connection electrode BE may be disposed on a different layer from the first touch electrode TE and the second touch electrode RE. For example, as shown in FIG. 6, the first touch electrode TE and the second touch electrode RE may be formed of a second touch conductive layer TCL2, the connection electrode BE may be formed of a first touch conductive layer TCL1, and a second touch insulating layer TIL2 may be disposed between the first touch conductive layer TCL1 and the second touch conductive layer TCL2. The first touch electrode TE may be electrically connected to the connection electrode BE through one or more first contact holes CNT1 penetrating the second touch insulating layer TIL2 to expose one end of the connection electrode BE.

The touch peripheral area TPA may be provided with touch electrode pads TP1 and TP2, routing lines TL1, TL2, and RL, guard lines GL1, GL2, GL3, GL4, and GL5, and ground lines GRL1, GRL2, and GRL3.

The touch electrode pads TP1 and TP2 may be disposed at one side of the display device 10. A touch circuit board (e.g., touch circuit board 300) may be attached to the touch electrode pads TP1 and TP2 using an anisotropic conductive film. Thus, the touch electrode pads TP1 and TP2 may be electrically connected to the touch circuit board 300.

The routing lines TL1, TL2, and RL may include a first routing line TL1, a second routing line TL2, and a third routing line RL.

One end of the first routing line TL1 may be connected to one side of the first touch electrode TE. For instance, one end of the first routing line TL1 may be connected to the first touch electrode TE disposed at the first side of the touch sensing area TSA. The first side of the touch sensing area TSA may be a side closest to the touch pad area where the touch electrode pads TP1 and TP2 are disposed, among the four sides of the touch sensing area TSA. The other end of the first routing line TL1 may be connected to some of the first touch electrode pads TP1 of the touch pad area. For example, the first routing line TL1 may serve to connect one side of the first touch electrode TE and the first touch electrode pad TP1.

Figure 9:
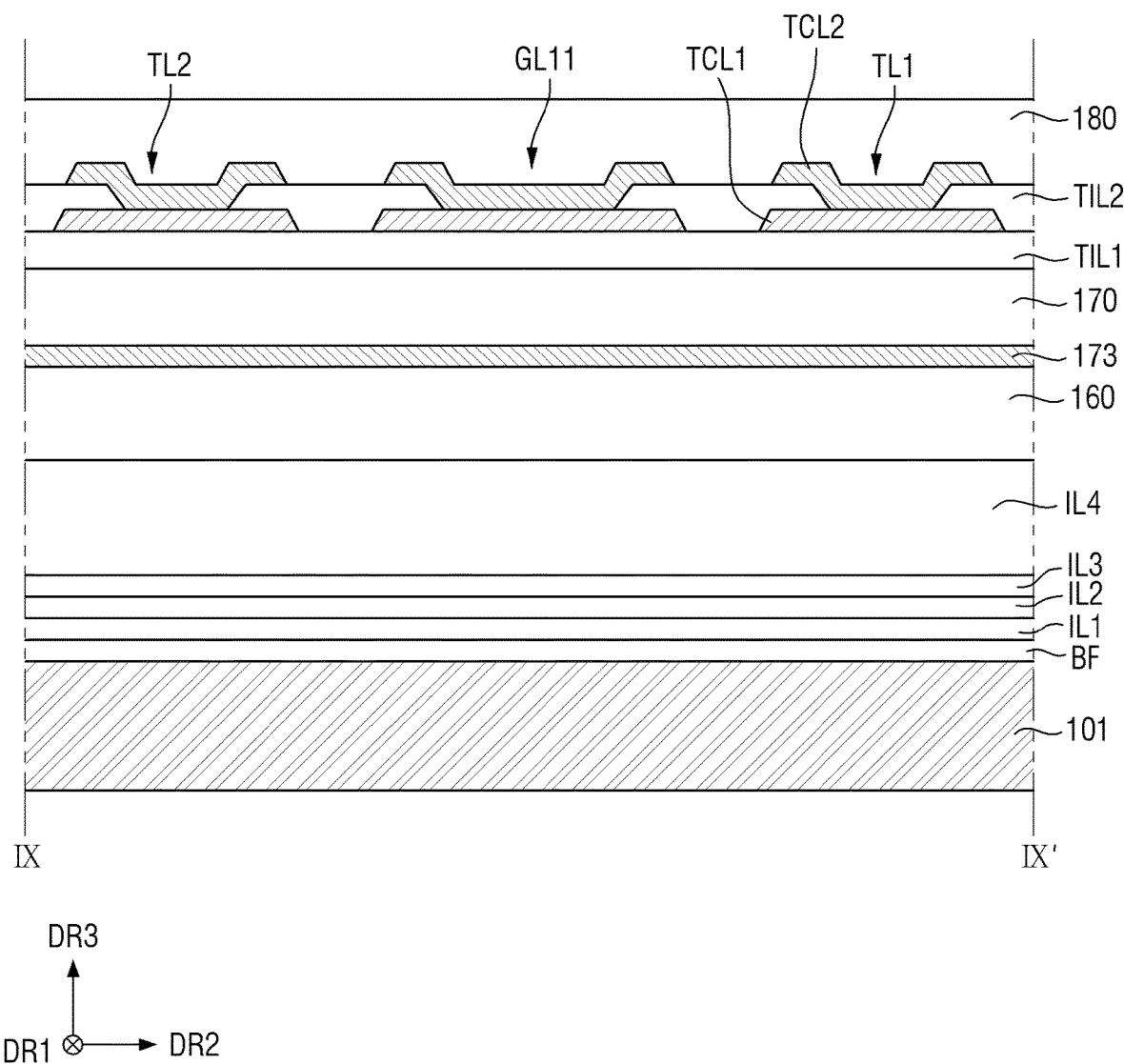
FIG. 9 is a cross-sectional view taken along sectional line IX-IX' of FIG. 8 according to an exemplary embodiment.

The first routing line TL1 may be formed of a plurality of conductive layers. For example, as shown in FIG. 9, the first routing line TL1 may include a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the first routing line TL1 is formed of the plurality of conductive layers, the resistance of the first routing line TL1 may be reduced.

One end of the second routing line TL2 may be connected to the other side of the first touch electrode TE. For instance, one end of the second routing line TL2 may be connected to the first touch electrode TE disposed at the second side of the touch sensing area TSA. The second side of the touch sensing area TSA may be a side located farthest from the touch pad area where the touch electrode pads TP1 and TP2 are disposed, the sided being a side opposite to the first side among the four sides of the touch sensing area TSA. The second routing line TL2 may be connected to the first touch electrode TE disposed at the second side via the first side and the fourth side of the touch sensing area TSA. The other end of the second routing line TL2 may be connected to some other ones of the first touch electrode pads TP1 of the touch pad area. For example, the second routing line TL2 may serve to connect the other side of the first touch electrode TE and the first touch electrode pad TP1.

The second routing line TL2 may be formed of a plurality of conductive layers. For example, as shown in FIG. 9, the second routing line TL2 may include a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the second routing line TL2 is formed of the plurality of conductive layers, the resistance of the second routing line TL2 may be reduced.

One end of the third routing line RL may be connected to one side of the second touch electrode RE. For instance, one end of the third routing line RL may be connected to the second touch electrode TE disposed at the third side of the touch sensing area TSA. The third side of the touch sensing area TSA may be a side located between the first side and the second side in the second direction DR2, which is a side opposite to the fourth side. The other end of the third routing line RL may be connected to the second touch electrode pad TP2 of the touch pad area. For example, the third routing line RL may serve to connect the second touch electrode RE and the second touch electrode pad TP2.

Figure 15:
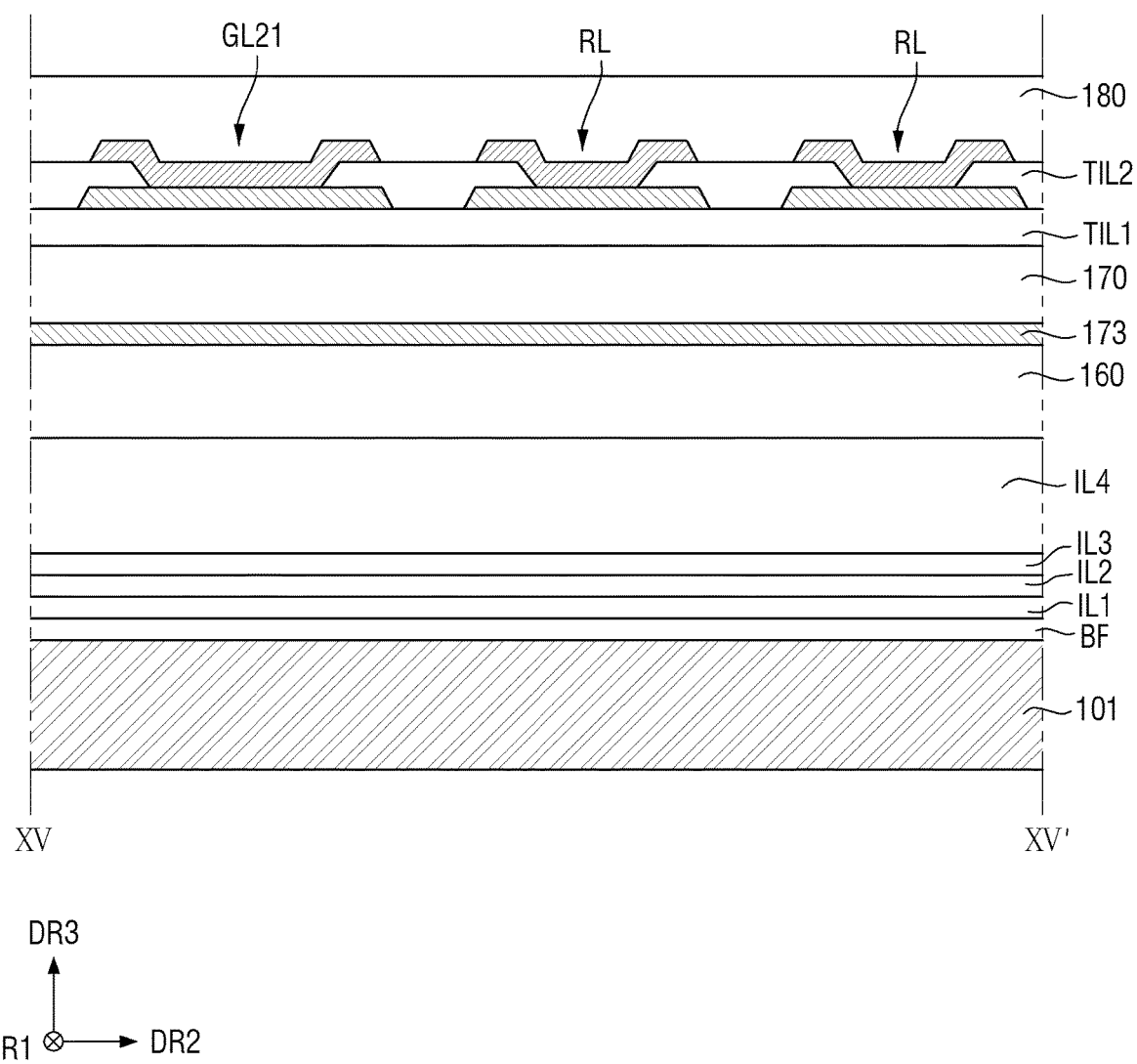
FIG. 15 is a cross-sectional view taken along sectional line XV-XV' of FIG. 14 according to an exemplary embodiment.

The third routing line RL may be formed of a plurality of conductive layers. For example, as shown in FIG. 15, the third routing line RL may include a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the third routing line RL is formed of the plurality of conductive layers, the resistance of the third routing line RL may be reduced.

Referring to FIGS. 4 to 7 again, the first touch electrodes TE and the second touch electrodes RE may be driven by a mutual capacitance method or a self-capacitance method.

First, when the first touch electrodes TE and the second touch electrodes RE are driven by a mutual capacitance method, touch driving signals are supplied to the first touch electrodes TE through the first routing line TL1 and the second routing line TL2, and thus, mutual capacitances formed in the crossing areas of the first touch electrodes TE and the second touch electrodes RE are charged. Then, charge changes of mutual capacitances are measured through the second touch electrodes RE, and whether a touch input (or interaction) occurs is determined depending on the charge changes of the mutual capacitances. The touch driving signals may be signals having a plurality of touch driving pulses.

Second, when the first touch electrodes TE and the second touch electrodes RE are driven in a self-capacitance method, the touch driving signals are supplied to both the first touch electrodes TE and the second touch electrodes RE through the first routing lines TL1, the second routing lines TL2, and the third routing lines RL to charge the self-capacitances of the first touch electrodes TE and the second touch electrodes RE. Then, the charge changes of self-capacitances are measured through the first routing lines TL1, the second routing lines TL2, and the third routing lines RL, and whether a touch input (or interaction) occurs is determined depending on the charge changes of the self-capacitances.

Hereinafter, for convenience of explanation, a description will be made assuming that a plurality of touch driving pulses are applied to the first touch electrodes TE, and the first touch electrodes TE and the second touch electrodes RE are driven in the mutual capacitance method in which the charge changes of mutual capacitances through the third routing lines RL connected to the second touch electrodes RE. In this case, the first touch electrodes TE may function as touch driving electrodes, the second touch electrodes RE may function as touch sensing electrodes, the first routing lines TL1 and the second routing lines TL2 may function as touch driving lines, and the third routing lines RL may function as touch sensing lines.

The ground lines GRL1, GRL2, GRL3, and GRL4 may be disposed outside the routing lines TL1, TL2, and RL.

For example, the first ground line GRL1 may be disposed outside the first routing line TL1. One end of the first ground line GRL1 may be connected to a first touch electrode pad TP1.

The second ground line GRL2 may be disposed at one side of the third routing line RL. One end of the second ground line GRL2 may be connected to a second touch electrode pad TP2.

The third ground line GRL3 may be disposed outside the second routing line TL2. The third ground line GRL3 may be disposed at the outermost side from the lower side, left side, and upper side of the touch sensing layer TSL. One end of the third ground line GRL3 may be connected to a first touch electrode pad TP1.

The fourth ground line GRL4 may be disposed at the other side of the third routing line RL. The fourth ground line GRL4 may be disposed at the outermost side from the right side of the touch sensing layer TSL. One end of the fourth ground line GRL4 may be connected to a second touch electrode pad TP2.

Ground voltages may be applied to the third ground line GRL3 and the fourth ground line GRL4. Thus, when static electricity is applied from the outside, the static electricity may be discharged to the third ground line GRL3 and the fourth ground line GRL4.

The guard lines GL1, GL2, GL3, GL4, and GL5 may be disposed between the routing lines TL1, TL2, RL and the ground lines GRL1, GRL2, GRL3, and GRL4, respectively.

For example, the first guard line GL1 may be disposed between the first routing line TL1 and the second routing line TL2. Thus, the first guard line GL1 may serve to minimize (or reduce) the coupling between the first routing line TL1 and the second routing line TL2. One end of the first guard line GL1 may be connected to a first touch electrode pad TP1. A portion of the first guard line GL1 may be formed of a single conductive layer, thereby preventing (or mitigating) electrostatic defects. Details thereof will be described later.

The second guard line GL2 may be disposed between the first routing line TL1 and the third routing line RL. Thus, the second guard line GL2 may serve to minimize (or reduce) the coupling between the first routing line TL1 and the third routing line RL. One end of the second guard line GL2 may be connected to a second touch electrode pad TP2. A portion of the second guard line GL2 may be formed of a single conductive layer, thereby preventing (or reducing) electrostatic defects. Details thereof will be described later.

The third guard line GL3 may be disposed between the first routing line TL1 and the first ground line GRL1. Thus, the third guard line GL3 may serve to minimize (or reduce) the influence of the voltage change of the first ground line GRL1 on the first routing line TL1. One end of the third guard line GL3 may be connected to a first touch electrode pad TP1.

The fourth guard line GL4 may be disposed between the second routing line TL2 and the third ground line GRL3. Thus, the fourth guard line GL4 may serve to minimize (or reduce) the influence of the voltage change of the third ground line GRL3 on the fourth guard line GL4. One end of the fourth guard line GL4 may be connected to a first touch electrode pad TP1.

The fifth guard line GL5 may be disposed between the third routing line RL and the fourth ground line GRL4. Thus, the fifth guard line GL5 may serve to minimize (or reduce) the influence of the voltage change of the fourth ground line GRL4 on the fifth guard line GL5. One end of the fifth guard line GL5 may be connected to a second touch electrode pad TP2.

Hereinafter, the first guard line GL1 and the second guard line GL2 will be described in more detail. FIGS. 8 to 17 are referred to for the detailed description of the first guard line GL1 and the second guard line GL2.

Figure 8:
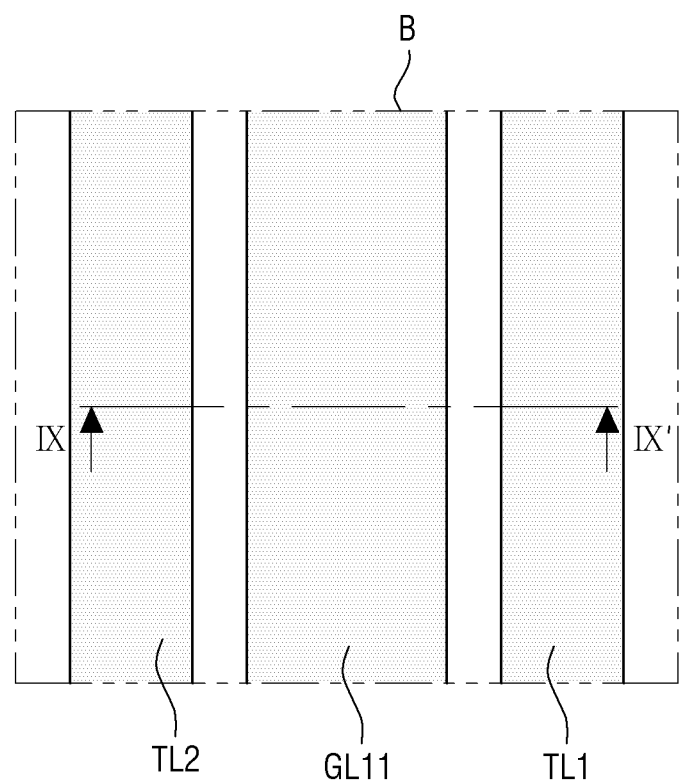
FIG. 8 is an enlarged view of area B of FIG. 4 according to an exemplary embodiment.
Figure 8:
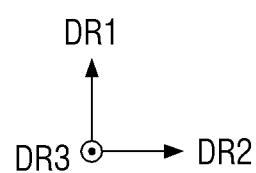
Figure 10:
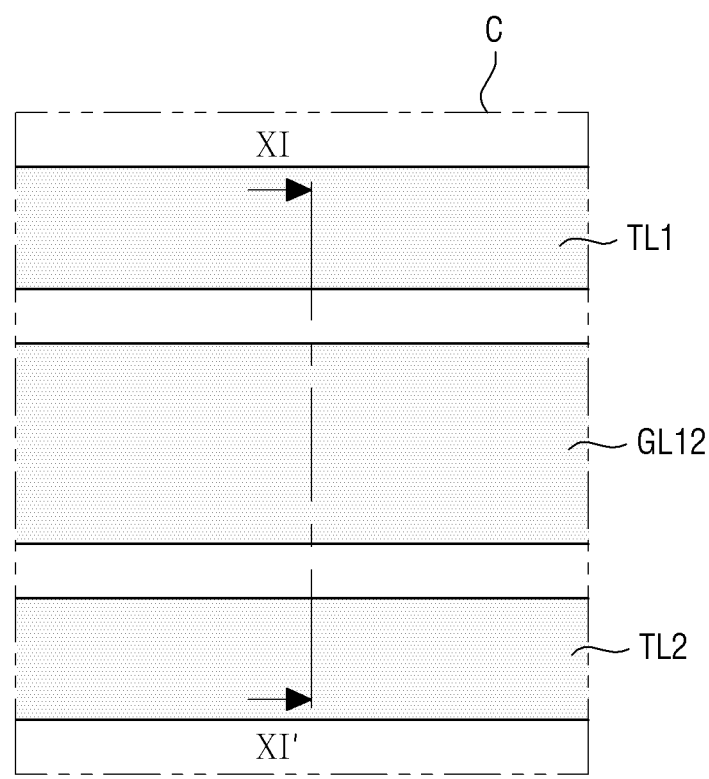
FIG. 10 is an enlarged view of area C of FIG. 4 according to an exemplary embodiment.
Figure 10:
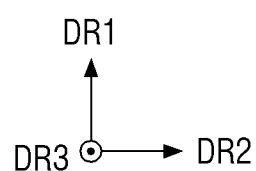
Figure 11:
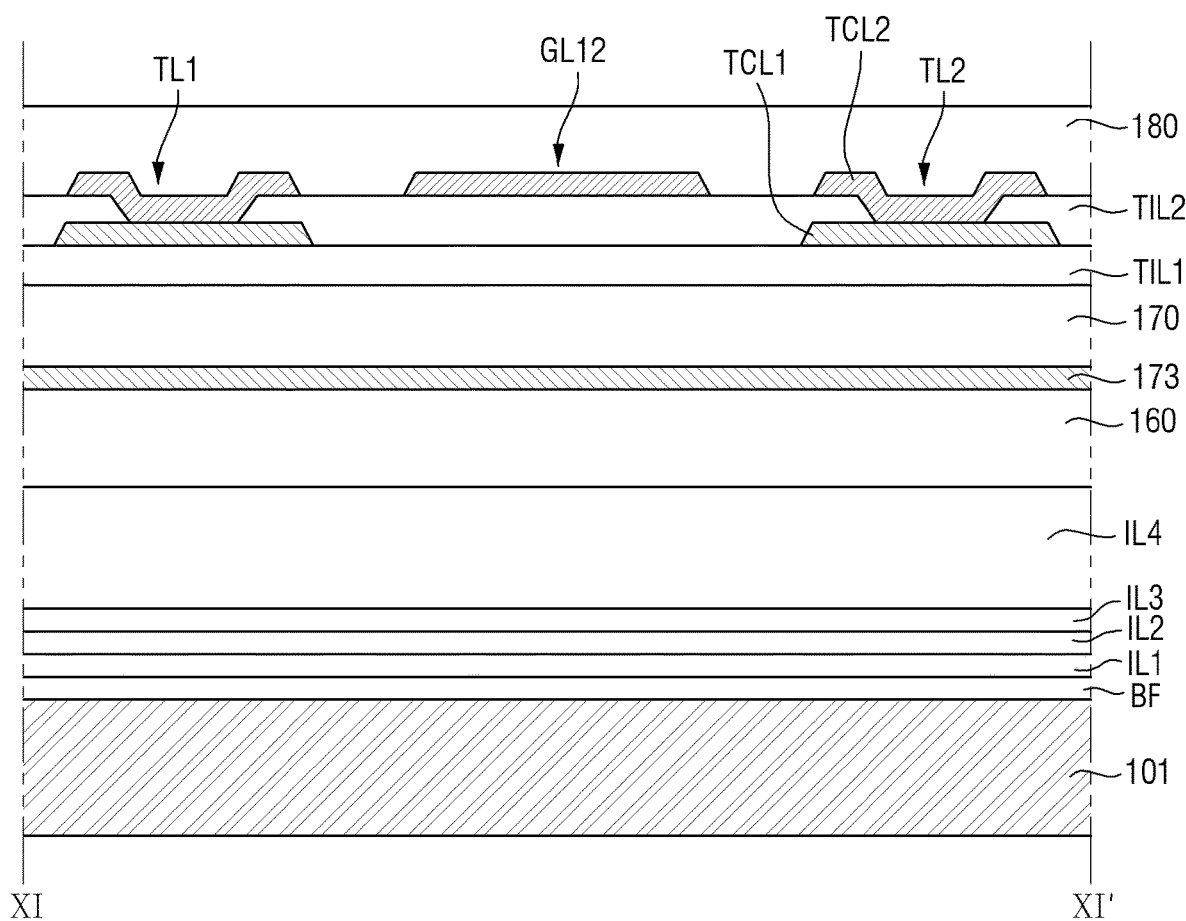
FIG. 11 is a cross-sectional view taken along sectional line XI-XI' of FIG. 10 according to an exemplary embodiment.
Figure 12:
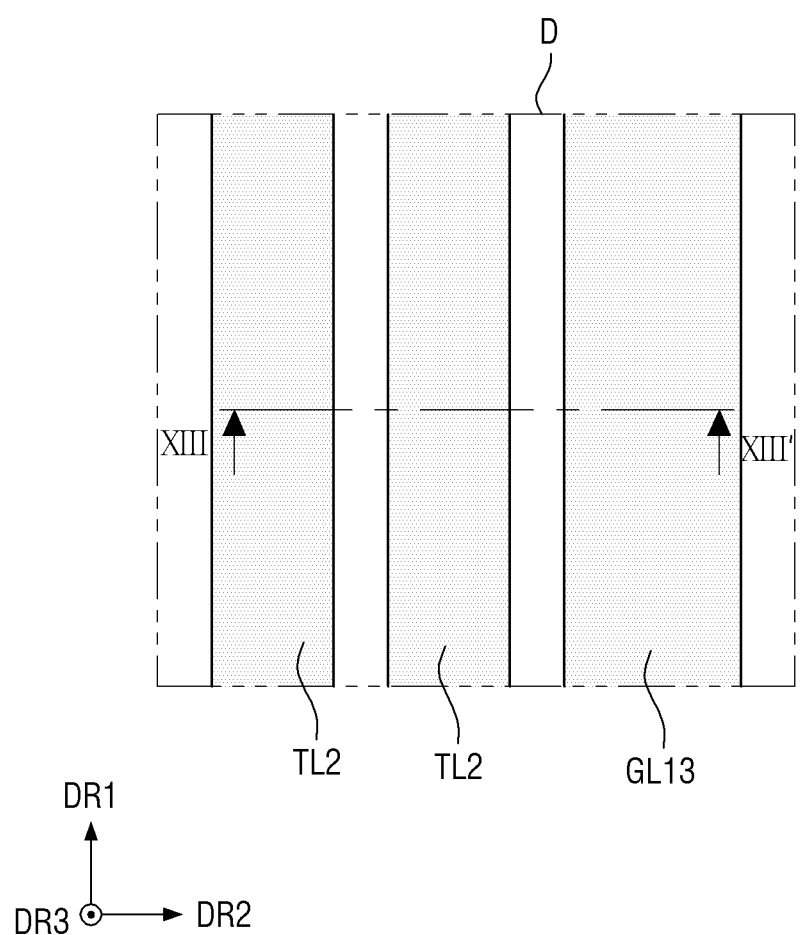
FIG. 12 is an enlarged view of area D of FIG. 4 according to an exemplary embodiment.
Figure 13:
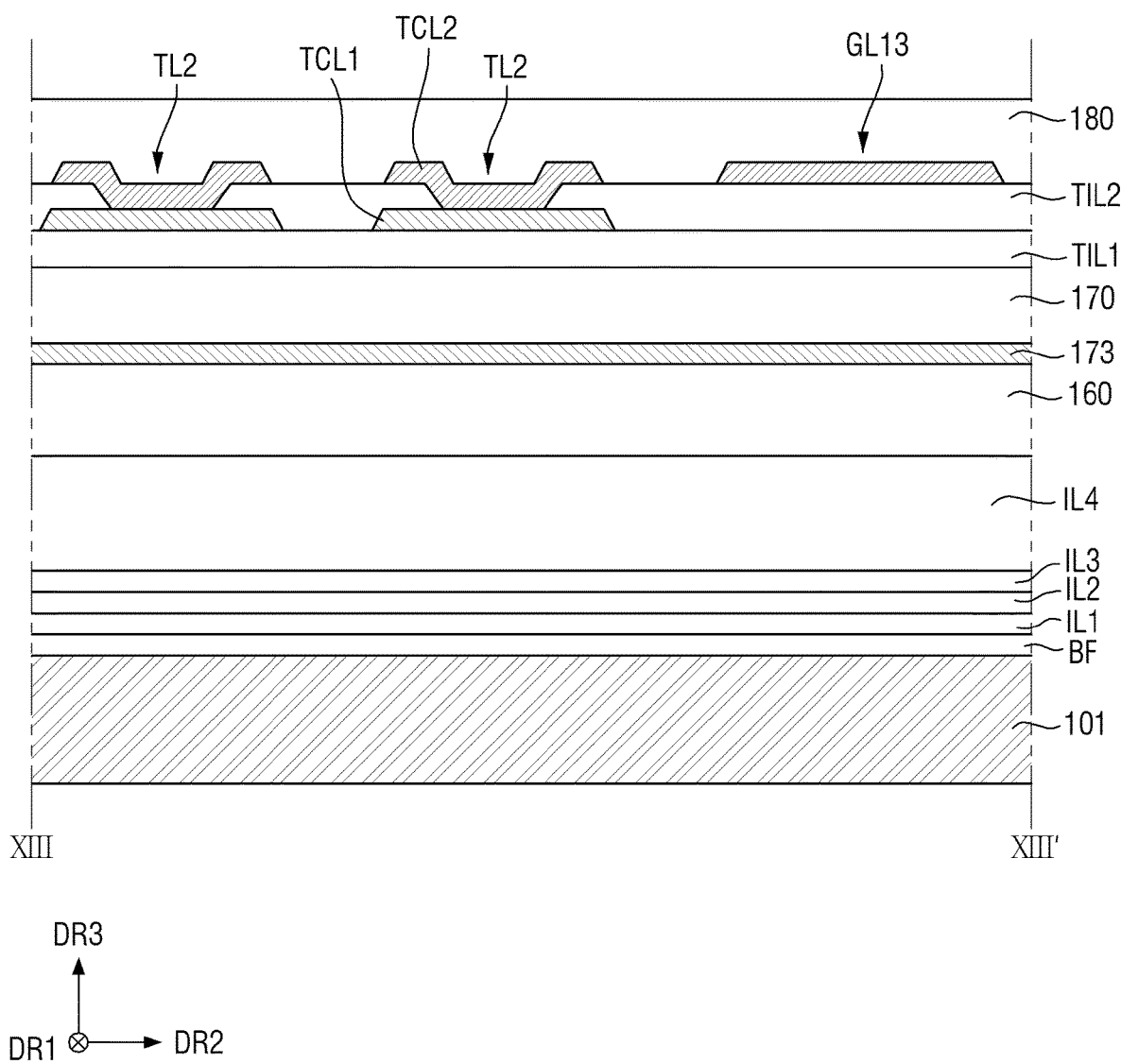
FIG. 13 is a cross-sectional view taken along sectional line XIII-XIII' of FIG. 12 according to an exemplary embodiment.
Figure 14:
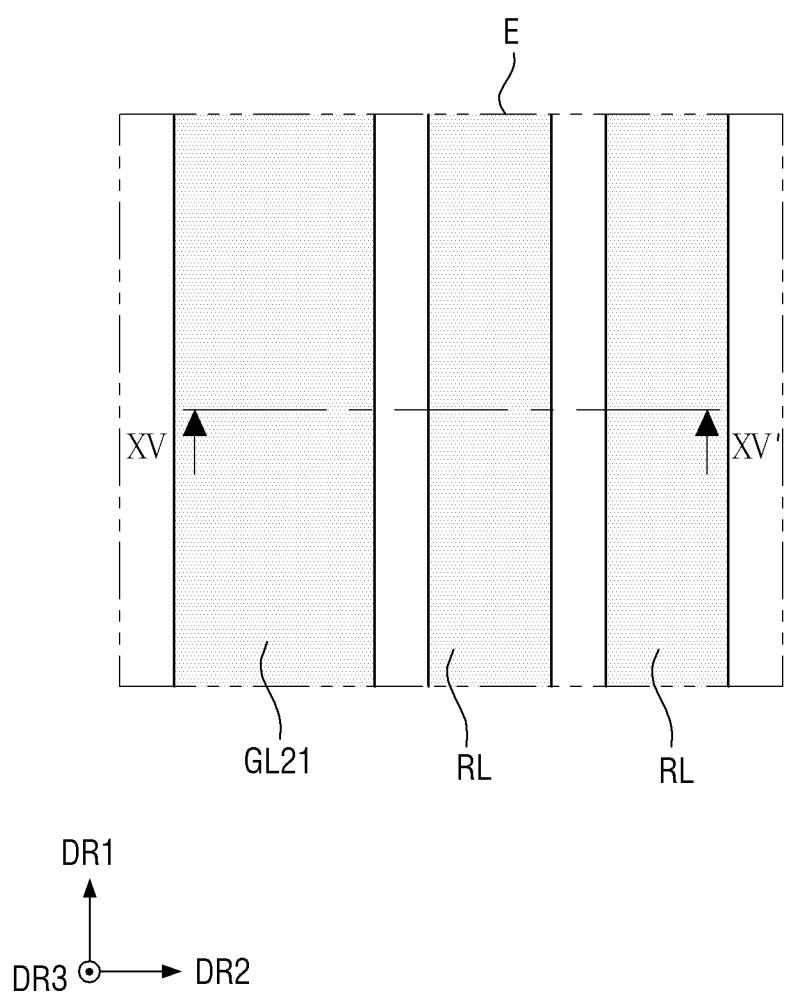
FIG. 14 is an enlarged view of area E of FIG. 4 according to an exemplary embodiment.
Figure 16:
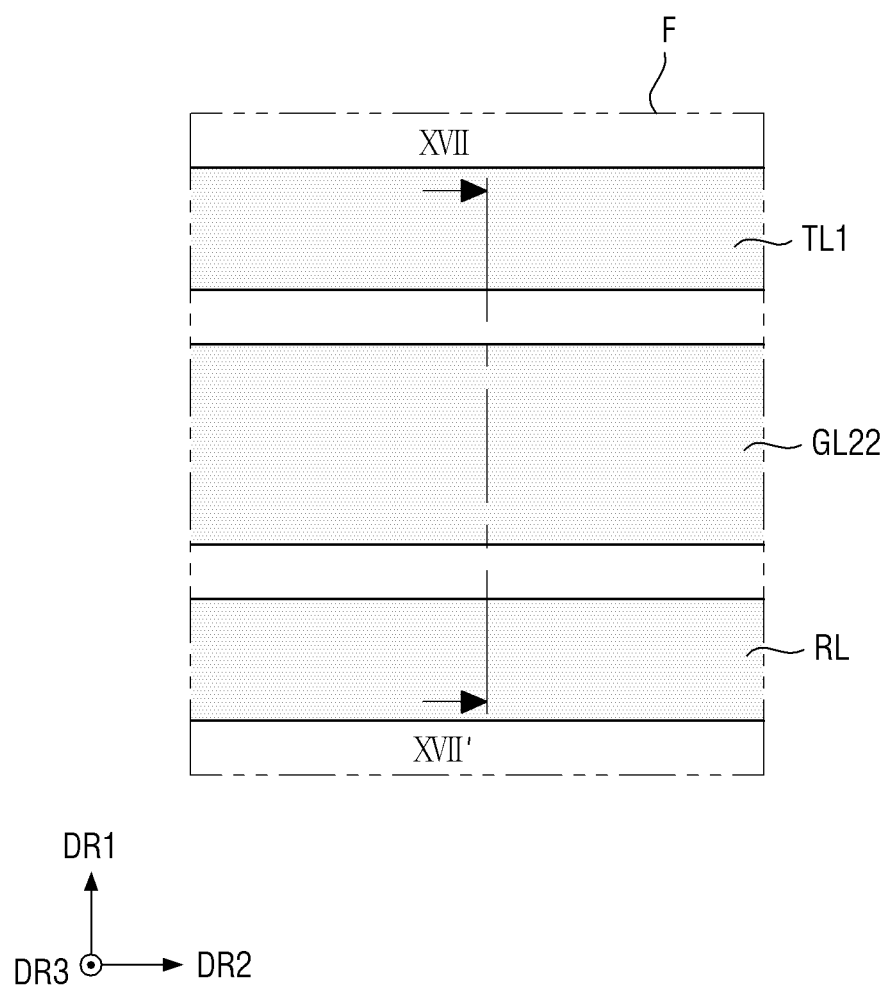
FIG. 16 is an enlarged view of area F of FIG. 4 according to an exemplary embodiment.
Figure 17:
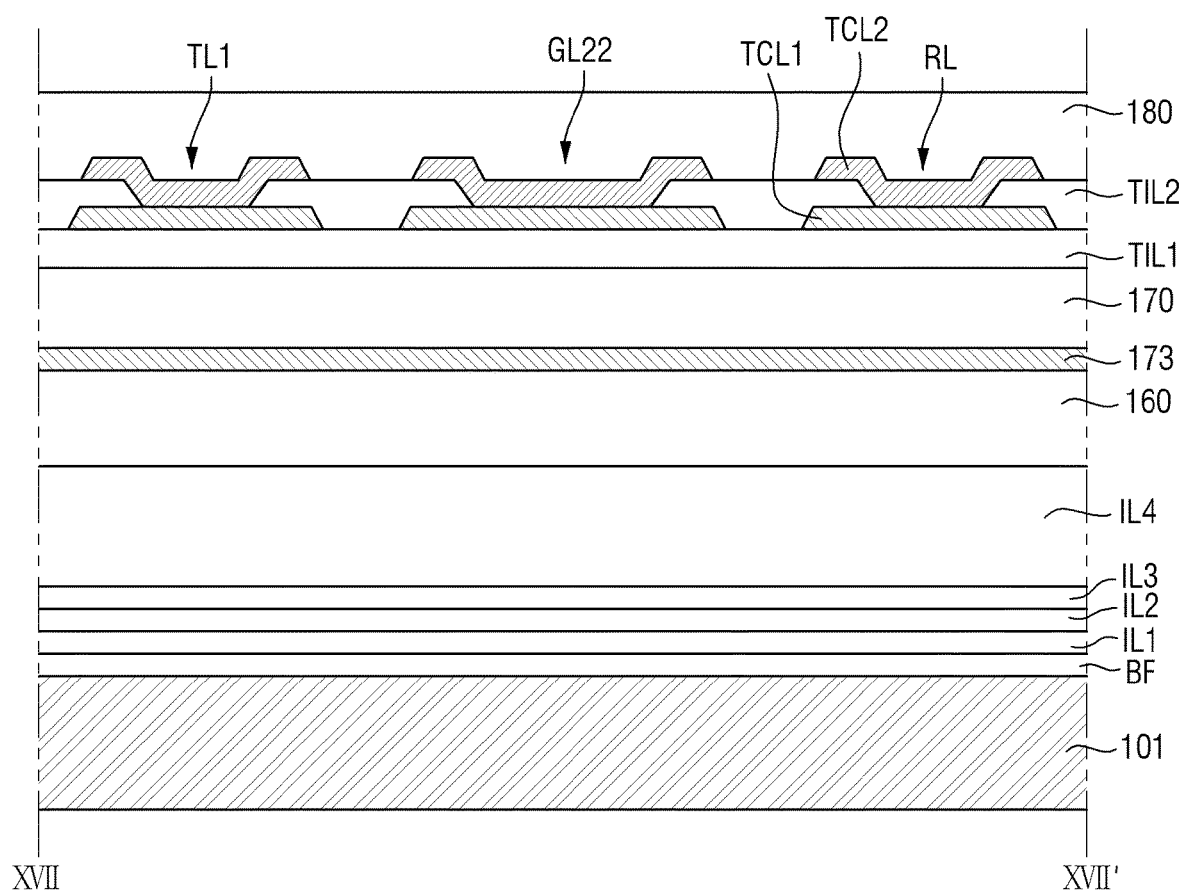
FIG. 17 is a cross-sectional view taken along sectional line XVII-XVII' of FIG. 16 according to an exemplary embodiment.

FIG. 8 is an enlarged view of area B of FIG. 4 according to an exemplary embodiment. FIG. 9 is a cross-sectional view taken along sectional line IX-IX' of FIG. 8 according to an exemplary embodiment. FIG. 10 is an enlarged view of area C of FIG. 4 according to an exemplary embodiment. FIG. 11 is a cross-sectional view taken along sectional line XI-XI' of FIG. 10 according to an exemplary embodiment. FIG. 12 is an enlarged view of area D of FIG. 4 according to an exemplary embodiment. FIG. 13 is a cross-sectional view taken along sectional line XIII-XIII' of FIG. 12 according to an exemplary embodiment. FIG. 14 is an enlarged view of area E of FIG. 4 according to an exemplary embodiment. FIG. 15 is a cross-sectional view taken along sectional line XV-XV' of FIG. 14 according to an exemplary embodiment. FIG. 16 is an enlarged view of area F of FIG. 4 according to an exemplary embodiment. FIG. 17 is a cross-sectional view taken along sectional line XVII-XVII' of FIG. 16 according to an exemplary embodiment.

Referring to FIGS. 4 and 8 to 17, the first guard line GL1 may include a first region GL11, a second region GL12, and a third region GL13.

The first region GL11 of the first guard line GL1 may extend along the first direction DR1. The first region GL11 of the first guard line GL1 may be formed of a plurality of conductive layers. For example, as shown in FIGS. 8 and 9, the first region GL11 of the first guard line GL1 includes a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the first region GL11 of the first guard line GL1 is formed of a plurality of conductive layers, the resistance of the first guard line GL1 may be reduced. One end of the first region GL11 of the first guard line GL1 may be connected to a first touch electrode pad TP1.

The second region GL12 of the first guard line GL1 may extend from the other end of the first region GL11 of the first guard line GL1 in a direction opposite to the second direction DR2. The second region GL12 of the first guard line GL1 may be a region closest to the first routing line TL1. In this case, electrostatic defects may occur due to a difference in the area (or length) between the first guard line GL1 and the first routing line TL1 adjacent thereto. For instance, when the first guard line GL1 is formed of a plurality of conductive layers, the electrostatic defects may be aggravated in the wiring process of the first touch conductive layer TCL1. Thus, in the display device 10, the second region GL12 of the first guard line GL1 may be formed of a single conductive layer. For example, as shown in FIGS. 10 and 11, the second region GL12 of the first guard line GL1 may include the second touch conductive layer TCL2, but may not overlap the first touch conductive layer TCL1. That is, in the second region GL12 of the first guard line GL1, the first touch conductive layer TCL1 may be omitted. In this case, one surface of the second touch insulating layer TIL2 may be in direct contact with the first touch insulating layer TILL and the other surface of the second touch insulating layer TIL2 may be in direct contact with a touch protection layer 180.

As described above, when the first touch conductive layer TCL1 is omitted in the second region GL12 of the first guard line GL1 and the second region GL12 is formed of a single conductive layer, electrostatic effects due to a difference in the area (or length) between the first guard line GL1 and the first routing line TL1 adjacent thereto can be prevented or mitigated.

The third region GL13 of the first guard line GL1 may extend from one end of the second region GL12 of the first guard line GL1 along the first direction DR1. For instance, the third region GL13 of the first guard line GL1 may be connected to the first region GL11 by way of the second region GL12. The third region GL13 of the first guard line GL1 may be formed of a single conductive layer. For example, as shown in FIGS. 12 and 13, the third region GL13 of the first guard line GL1 may include the second touch conductive layer TCL2, but may not overlap the first touch conductive layer TCL1. For example, in the third region GL13 of the first guard line GL1, the first touch conductive layer TCL1 may be omitted. In this case, one surface of the second touch insulating layer TIL2 may be in direct contact with the first touch insulating layer TILL and the other surface of the second touch insulating layer TIL2 may be in direct contact with the touch protection layer 180. As described above, when the first touch conductive layer TCL1 is omitted in the third region GL13 of the first guard line GL1 and the third region GL13 is formed of a single conductive layer, electrostatic effects occurring in the third region GL13 of the first guard line GL1 can be prevented or mitigated.

The second guard line GL2 may be disposed between the first routing line TL1 and the third routing line RL. Thus, the second guard line GL2 may serve to minimize (or reduce) the coupling between the first routing line TL1 and the third routing line RL. One end of the second guard line GL2 may be connected to a second touch electrode pad TP2.

The second guard line GL2 may include a first region GL21 and a second region GL22.

The first region GL21 of the second guard line GL2 may extend along the first direction DR1. The first region GL21 of the second guard line GL2 may be formed of a plurality of conductive layers. For example, as shown in FIGS. 14 and 15, the first region GL21 of the second guard line GL2 includes a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the second region GL21 of the second guard line GL2 is formed of a plurality of conductive layers, the resistance of the second guard line GL2 may be reduced. One end of the first region GL21 of the second guard line GL2 may be connected to the second touch electrode pad TP2.

The second region GL22 of the second guard line GL2 may extend from the other end of the first region GL21 of the second guard line GL2 in the second direction DR2. The second region GL22 of the second guard line GL2 may be formed of a single conductive layer. For example, as shown in FIGS. 16 and 17, the second region GL22 of the second guard line GL2 may include the second touch conductive layer TCL2, but may not overlap the first touch conductive layer TCL1. For instance, in the second region GL22 of the second guard line GL2, the first touch conductive layer TCL1 may be omitted. In this case, one surface of the second touch insulating layer TIL2 may be in direct contact with the first touch insulating layer TILL and the other surface of the second touch insulating layer TIL2 may be in direct contact with the touch protection layer 180. As described above, when the second region GL22 of the second guard line GL2 is formed of a single conductive layer, electrostatic effects occurring in the second region GL22 of the second guard line GL2 can be prevented or mitigated.

As described above, when a portion of the first guard line GL1 and the second guard line GL2 adjacent to the first routing line TL1 is formed of a single conductive layer, electrostatic defects occurring in a region adjacent to the first routing line TL1 can be prevented or mitigated.

Hereinafter, an exemplary cross-sectional structure of the display device 10 will be described in more detail. FIG. 7 will be referred to for the detailed description of the exemplary cross-sectional structure of the display device 10.

Referring to FIG. 7, the display device 10 may include a substrate 101, a buffer layer BF, a semiconductor layer ACT, a first insulating layer ILL a first conductive layer 110, a second insulating layer IL2, a second conductive layer 120, a third insulating layer IL3, a third conductive layer 130, a fourth insulating layer IL4, a first electrode layer 171, a pixel defining film 160 including an opening exposing the first electrode layer 171, a light emitting layer 172 disposed in the opening of the pixel defining film 160, a second electrode layer 173 disposed on the light emitting layer 172 and the pixel defining film 160, and a passivation layer 170.

Each of the aforementioned layers may be formed of a single film, but may also be formed of a laminated film including a plurality of films. At least one other layer may further be disposed between the respective layers.

The substrate 101 may support the respective layers disposed thereon. The substrate 101 may be made of an insulating material. The substrate 101 may be made of an inorganic material, such as glass or quartz, or an organic material, such as polyimide. It is noted, however, that any suitable material(s) may be utilized in association with exemplary embodiments. The substrate 101 may be a rigid substrate, a flexible substrate, or a hybrid rigid and flexible substrate.

The buffer layer BF is disposed on the substrate 101. The buffer layer BF may prevent (or mitigate) the diffusion of impurity ions, prevent (or mitigate) the penetration of moisture, and perform a surface planarization function. The buffer layer BF may include at least one of silicon nitride, silicon oxide, and silicon oxynitride.

The semiconductor layer ACT is disposed on the buffer layer BF. The semiconductor layer ACT forms a channel of a plurality of transistors of pixels PX. The semiconductor layer ACT may include, for instance, polycrystalline silicon. Polycrystalline silicon may be formed by crystallizing amorphous silicon.

In the case where the semiconductor layer ACT is made of polycrystalline silicon, when the semiconductor layer ACT is doped with ions, the ion-doped semiconductor layer ACT may have conductivity. Thus, the semiconductor layer ACT may include not only a channel region of a plurality of transistors, but also a source region and a drain region. The source region and the drain region may be connected to both sides of each channel region.

In another exemplary embodiment, the semiconductor layer ACT may include monocrystalline silicon, low-temperature polycrystalline silicon, amorphous silicon, or an oxide semiconductor. Examples of the oxide semiconductor may include a two-component compound $AB_x$, a three-component compound ABxCy, and/or a four-component compound $AB_xC_yD_z$, each selectively containing at least one of indium (In), zinc (Zn), gallium (Ga), tin (Sn), titanium (Ti), aluminum (Al), hafnium (Hf), zirconium (Zr), and magnesium (Mg). In an exemplary embodiment, the semiconductor layer ACT may include ITZO (i.e., an oxide including indium, tin, and titanium) or IGZO (i.e., an oxide including indium, gallium, and tin).

The first insulating layer IL1 is disposed on the semiconductor layer ACT. The first insulating layer IL1 may be generally disposed over the entire surface of the substrate 101. The first insulating layer IL1 may be a gate insulating film having a gate insulating function. The first insulating layer IL1 may include at least one of a silicon compound, a metal oxide, and the like. For example, the first insulating layer IL1 may include at least one of silicon oxide, silicon nitride, silicon oxynitride, aluminum oxide, tantalum oxide, hafnium oxide, zirconium oxide, titanium oxide, and the like. The first insulating layer IL1 may be a single-layer film or a multi-layer film formed of laminated layers of at least two different materials.

The first conductive layer 110 is disposed on the first insulating layer IL1. The first conductive layer 110 may include at least one metal, such as at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first conductive layer 110 may be a single-layer film or a multi-layer film. The first conductive layer 110 may include a gate electrode of a transistor and a first electrode of a storage capacitor.

The second insulating layer IL2 is disposed on the first conductive layer 110. The second insulating layer IL2 may be generally disposed over the entire surface of the substrate 101. The second insulating layer IL2 serves to insulate the first conductive layer 110 and the second conductive layer 120.

The second insulating layer IL2 may be an interlayer insulating film. The second insulating layer IL2 may include the same material as the aforementioned first insulating layer IL1 or may include at least one material selected from those materials exemplified as constituent materials of the first insulating layer IL1.

The second conductive layer 120 is disposed on the second insulating layer IL2. The second conductive layer 120 may include a second electrode of a storage capacitor. The second conductive layer 120 may overlap the first conductive layer 110 with the second insulating layer IL2 interposed therebetween to form the storage capacitor. The second conductive layer 120 may include at least one metal, such as at least one of molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The second conductive layer 120 may be made of the same material as the first conductive layer 110, but the material thereof is not limited thereto. The second conductive layer 120 may be a single-layer film or a multi-layer film.

The third insulating layer IL3 covers the second conductive layer 120. The third insulating layer IL3 insulates the second conductive layer 120 from the third conductive layer 130. The third insulating layer IL3 may include the same material as the first insulating layer IL1 or may include at least one material selected from those materials exemplified as constituent materials of the first insulating layer IL1.

The third conductive layer 130 is disposed on the third insulating layer IL3. The third conductive layer 130 may include at least one metal, such as at least one of molybdenum (Mo), aluminum (Al), germanium (Ge), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The third conductive layer 130 may be a single-layer film or a multi-layer film. For example, the third conductive layer 130 may be formed to have a laminate structure of Ti/Al/Ti, Mo/Al/Mo, Mo/AlGe/Mo, or Ti/Cu. The third conductive layer 130 may include the aforementioned data lines 320, a source electrode SE, and a drain electrode DE. The source electrode SE and the drain electrode DE may be connected to the source region and drain region of the semiconductor layer ACT through a contact hole penetrating the third insulating layer IL3, the second insulating layer IL2, and the first insulating layer IL1.

The fourth insulating layer IL4 covers the third conductive layer 130. The fourth insulating layer IL4 may be a via layer. The fourth insulating layer IL4 may include an organic insulating layer, such as include at least one of acrylic resin, epoxy resin, phenol resin, polyamide resin, polyimide resin, unsaturated polyester resin, polyphenylene ether resin, polyphenylene sulfide resin, and benzocyclobutene (BCB).

The first electrode layer 171 is disposed on the fourth insulating layer IL4. The first electrode layer 171 may have a laminate structure of a material layer having a high work function, such as indium-tin-oxide (ITO), indium-zinc-oxide (IZO), zinc oxide (ZnO), or indium oxide (In$_2$O$_3$), and a reflective layer including at least one of silver (Ag), magnesium (Mg), aluminum (Al), platinum (Pt), lead (Pb), gold (Au), nickel (Ni), neodymium (Nd), iridium (Ir), chromium (Cr), lithium (Li), and calcium (Ca). The material layer having a high work function may be disposed above the reflective material layer to be closer to the light emitting layer 172. The first electrode layer 171 may have a multi-layer structure of ITO/Mg, ITO/MgF (magnesium fluoride), ITO/Ag, or ITO/Ag/ITO, but exemplary embodiments are not limited thereto. The anode electrode of the pixels PX may be formed of the first electrode layer 171. The anode electrode may be connected to the drain electrode DE through a contact hole penetrating the fourth insulating layer IL4.

The pixel defining film 160 may be disposed on the first electrode layer 171. The pixel defining film 160 may include an inorganic insulating material, such as at least one of silicon oxide, silicon nitride, silicon oxynitride, aluminum oxide, tantalum oxide, hafnium oxide, zirconium oxide, and titanium oxide, and/or an organic insulating material, such as at least one of acrylic resin, epoxy resin, phenol resin, polyamide resin, polyimide resin, unsaturated polyester resin, polyphenylene ether resin, polyphenylene sulfide resin, and benzocyclobutene (BCB). The pixel defining film 160 may be a single-layer film or a multi-layer film formed of laminated layers of at least two different materials.

The pixel defining film 160 may include an opening that exposes the first electrode layer 171. The opening may define a light emitting area of each pixel PX.

The light emitting layer 172 is disposed in the opening of the pixel defining film 160. The light emitting layer 172 may include an organic light emitting layer, a hole injection/transport layer, and an electron injection/transport layer.

The second electrode layer 173 is disposed on the light emitting layer 172 and the pixel defining film 160. A cathode electrode of the pixels PX may be formed of the second electrode layer 173. The cathode electrode may be disposed over the entire display area DA.

The second electrode layer 173 may include a material layer having a low work function, such as at least one of Li, Ca, LiF/Ca, LiF/Al, Al, Mg, Ag, Pt, Pd, Ni, Au Nd, Ir, Cr, BaF, and Ba, or a compound or mixture thereof (for example, a mixture of Ag and Mg). The second electrode layer 173 may further include a metal oxide layer disposed on the material layer having a low work function.

The passivation layer 170 may be disposed on the second electrode layer 173. The passivation layer 170 may prevent (or mitigate) moisture or oxygen from penetrating into the light emitting layer 172. The passivation layer 170 may include at least one inorganic film and/or organic film. The inorganic film may include at least one inorganic material, such as at least one of Al$_x$O$_y$, TiO$_x$, ZrO$_x$, SiO$_x$, AlO$_x$N$_y$, Al$_x$N$_y$, SiO$_x$N$_y$, Si$_x$N$_y$, ZnO$_x$, and Ta$_x$O$_y$. The organic film may be formed by polymerization of at least one monomer, such as at least one of pentabromophenyl acrylate, 2-(9H-Carbazol-9-yl) ethyl methacrylate, N-vinylcarbazole, bis(4-methacryloyl thiophenyl) sulfide, and zirconium acrylate. The organic film may be a planarization film.

The touch sensing layer TSL may be disposed on the passivation layer 170.

The touch sensing layer TSL may include the first touch insulating layer TILL the first touch conductive layer TCL1, the second touch insulating layer TIL2, the second touch conductive layer TCL2, and the touch protection layer 180.

Each of the aforementioned layers may be formed of a single film, but may also be formed of a laminated film including a plurality of films. At least one other layer may further be disposed between the respective layers.

The first touch insulating layer TIL1 may include an organic film and/or an inorganic film. The organic film may include at least one of acrylic resin, methacrylic resin, polyisoprene, vinyl resin, epoxy resin, urethane resin, cellulose resin, siloxane resin, polyimide resin, polyamide resin, and perylene resin. The inorganic layer may include at least one of aluminum oxide, titanium oxide, silicon oxide silicon oxynitride, zirconium oxide, and hafnium oxide.

The first touch conductive layer TCL1 may be disposed on the first touch insulating layer TIL1. The first touch conductive layer TCL1 may include at least one of molybdenum, titanium, copper, and aluminum, or an alloy thereof. The first touch conductive layer TCL1 may include the aforementioned connection electrode BE. As described above, the first touch conductive layer TCL1 constituting the connection electrode BE may have a mesh shape. In this case, the first touch conductive layer TCL1 may not be visually recognized by a user of the display device 10. Further, the connection electrode BE may be disposed to overlap the pixel defining film 160 to prevent (or mitigate) the aperture ratio of the pixel PX from decreasing. Further, the first touch conductive layer TCL1 may be disposed on the routing lines TL1, TL2, and RL, the guard lines GL1, GL2, GL3, GL4, and GL5, and/or the ground lines GRL1, GRL2, GRL3, and GRL4.

The second touch insulating layer TIL2 may be disposed on the first touch conductive layer TCL1. The second touch insulating layer TIL2 insulates the first touch conductive layer TCL1 and the second touch conductive layer TCL2. The second touch insulating layer TIL2 may include the same material as the first touch insulating layer TIL1 or may include at least one material selected from those materials exemplified as constituent materials of the first touch insulating layer TIL1.

The second touch conductive layer TCL2 may be disposed on the second touch insulating layer TIL2. The second touch conductive layer TCL2 may include the same material as the first touch conductive layer TCL1 or may include at least one material selected from those materials exemplified as constituent materials of the first touch conductive layer TCL1. The second touch conductive layer TCL2 may include the first touch electrode TE and the second touch electrode RE. As described above, the second touch conductive layer TCL2 constituting the first touch electrode TE and the second touch electrode RE may have a mesh shape. In this case, the second touch conductive layer TCL2 may not be visually recognized by a user of the display device 10. Further, the first touch electrode TE and the second touch electrode RE may be disposed to overlap the pixel defining film 160 to prevent (or mitigate) the aperture ratio of the pixel from decreasing. Further, the second touch conductive layer TCL2 may be disposed on the routing lines TL1, TL2, and RL, the guard lines GL1, GL2, GL3, GL4, and GL5, and/or the ground lines GRL1, GRL2, GRL3, and GRL4.

The touch protection layer 180 may be disposed on the second touch conductive layer TCL2. The touch protection layer 180 may include the same material as the first touch insulating layer TIL1 or may include at least one material selected from those materials exemplified as constituent materials of the first touch insulating layer TIL1.

Hereinafter, various additional exemplary embodiments will be described. In the following exemplary embodiments, the same components as the above-described components are referred to by the same reference numerals, and redundant descriptions will be omitted or simplified.

Figure 18:
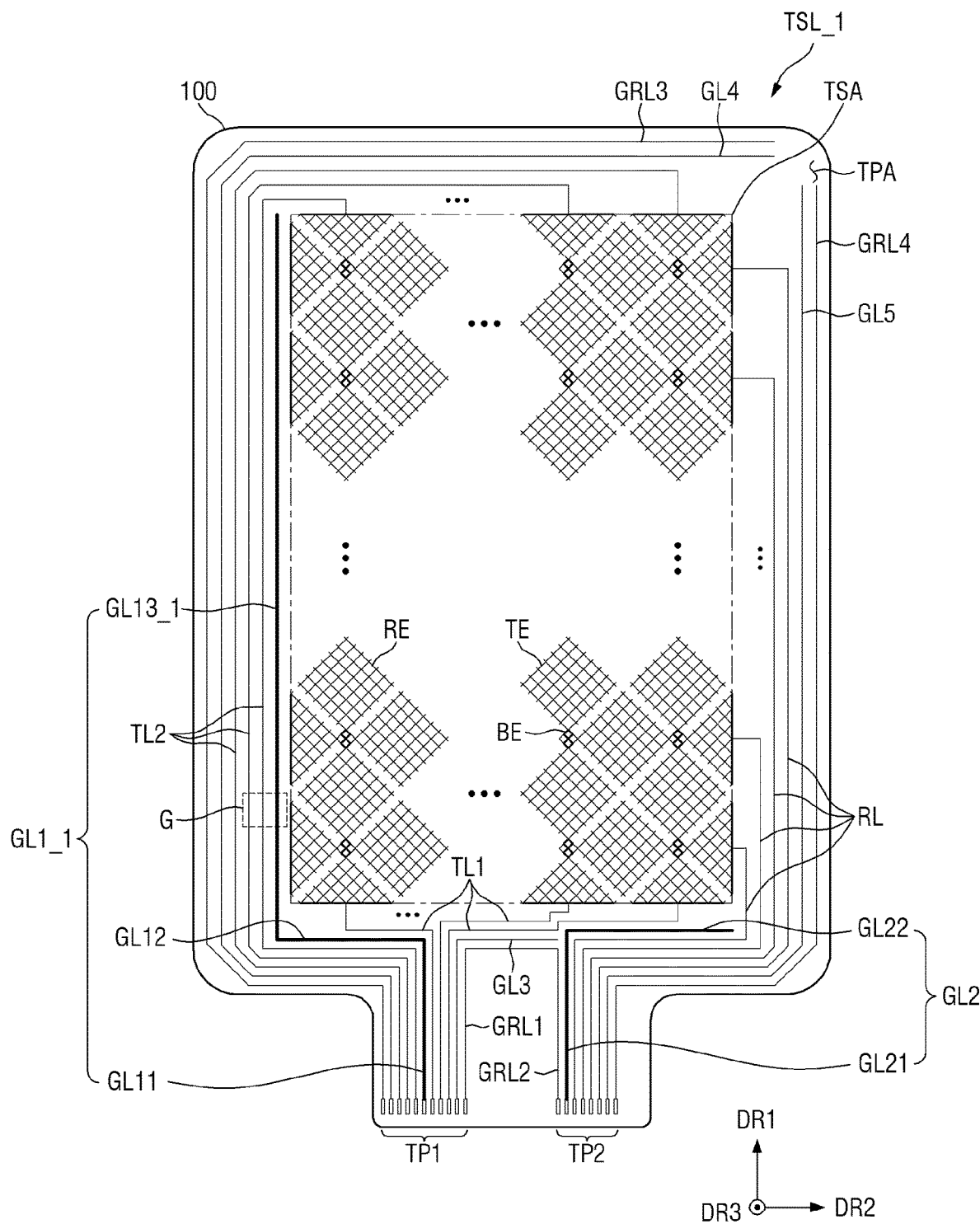
FIG. 18 is a plan view of a display device according to an exemplary embodiment.
Figure 19:
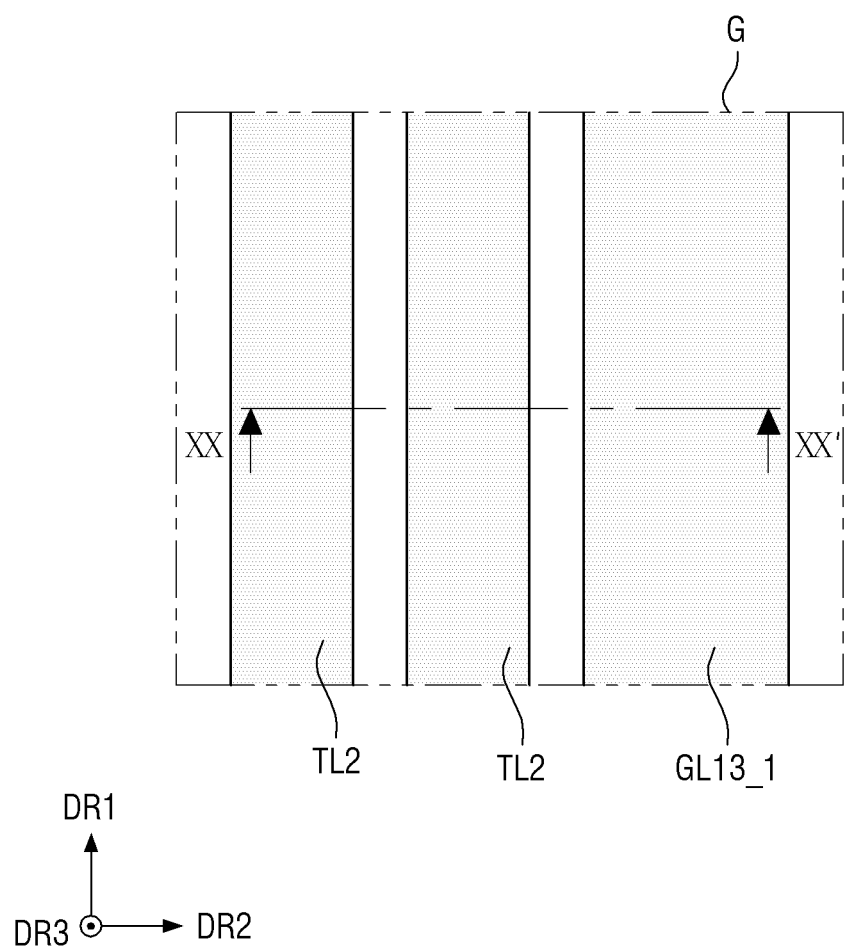
FIG. 19 is an enlarged view of area G of FIG. 18 according to an exemplary embodiment.
Figure 20:
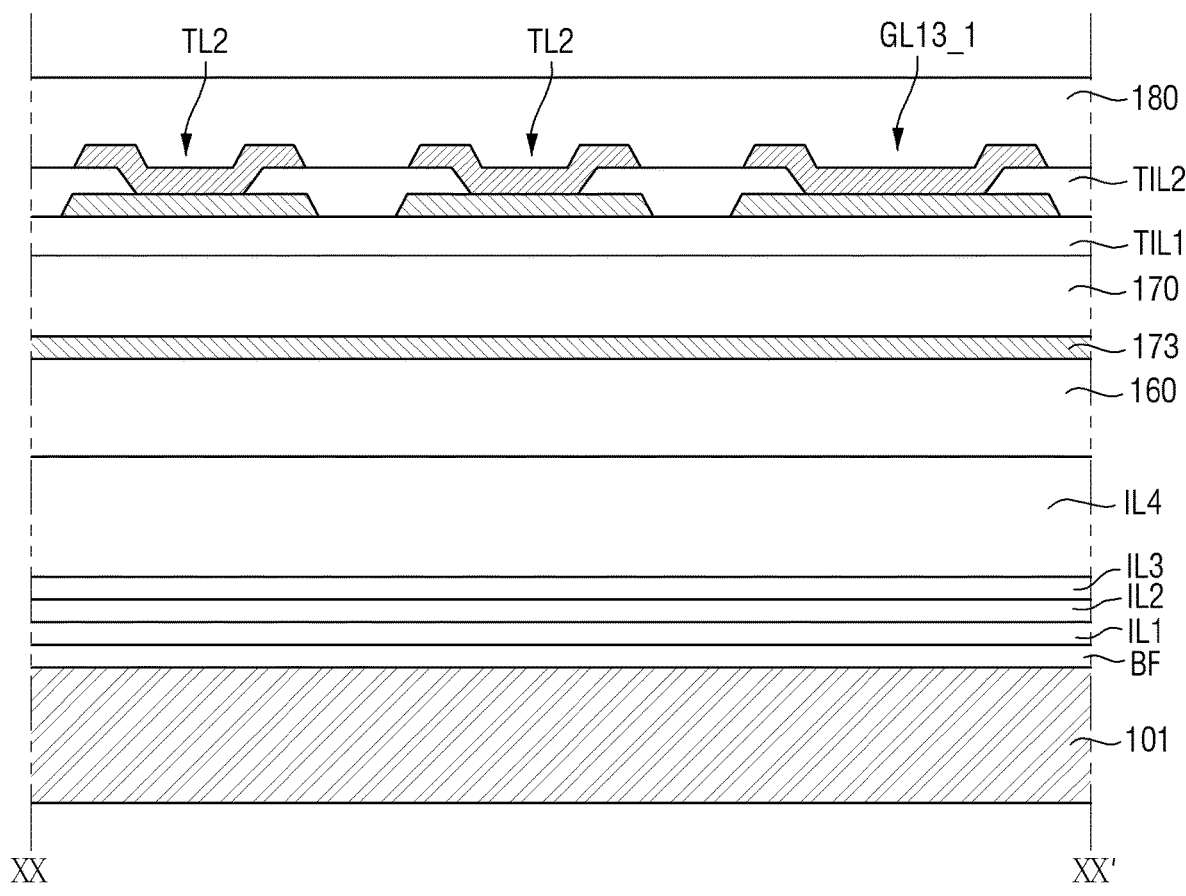
FIG. 20 is a cross-sectional view taken along sectional line XX-XX' of FIG. 19 according to an exemplary embodiment.
Figure 20:
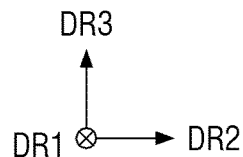

FIG. 18 is a plan view of a display device according to an exemplary embodiment. FIG. 19 is an enlarged view of area G of FIG. 18 according to an exemplary embodiment. FIG. 20 is a cross-sectional view taken along sectional line XX-XX' of FIG. 19 according to an exemplary embodiment.

Referring to FIGS. 18 to 20, the display device is different from that of the exemplary embodiment of FIGS. 1 to 17 in that a third region GL13_1 of a first guard line GL1_1 of a touch sensing layer TSL_1 is formed of a plurality of conductive layers.

For example, the third region GL13_1 of the first guard line GL1_1 may include a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. When the third region GL13_1 of the first guard line GL1 is formed of a plurality of conductive layers, the resistance of the first guard line GL1_1 may be reduced.

In addition, since the first region GL11 and the second region GL12 of the first guard line GL1_1, and the first region GL21 and the second region GL22 of the second guard line GL2 have been described with reference to FIG. 17, duplicated contents are omitted.

Figure 21:
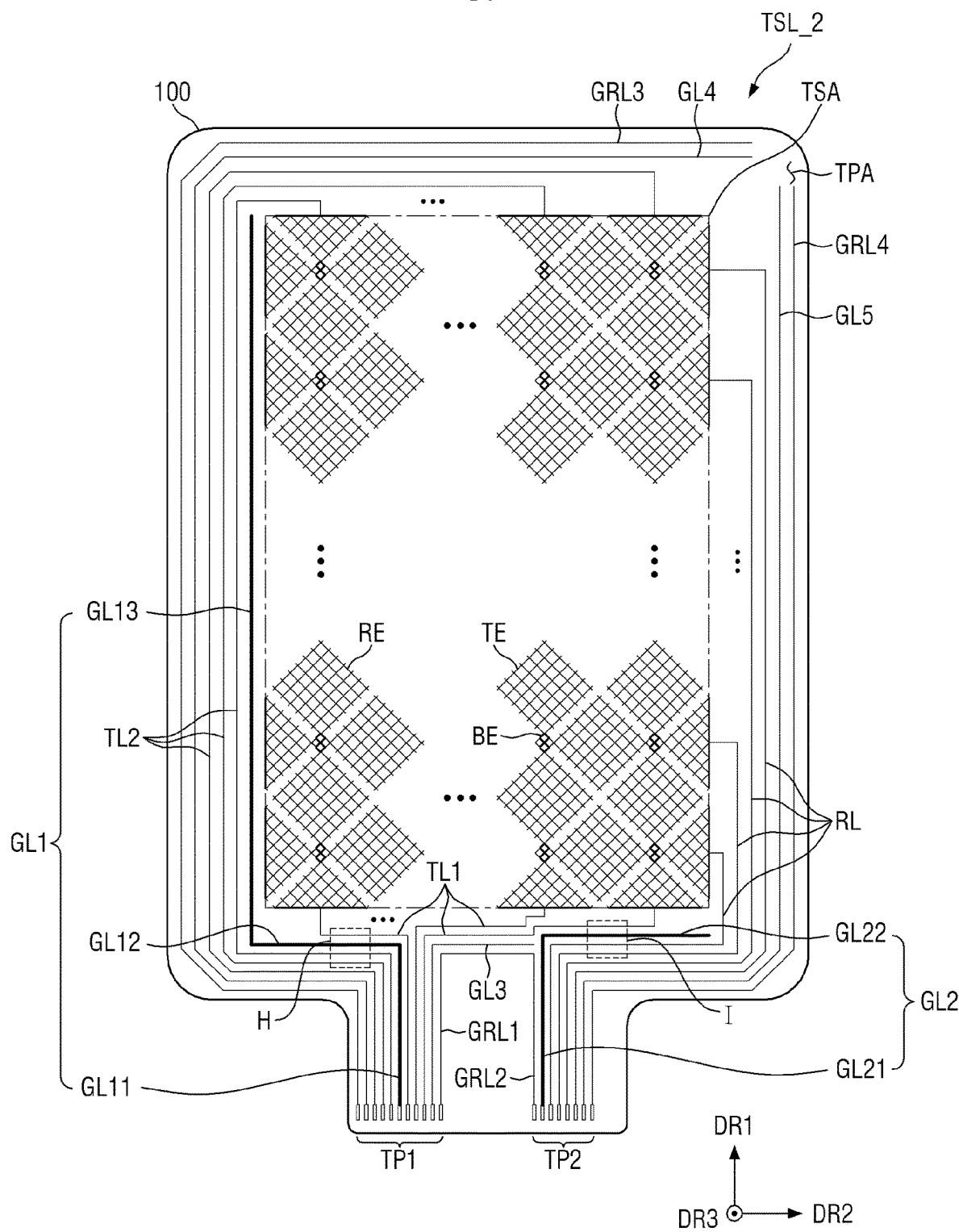
FIG. 21 is a plan view of a display device according to an exemplary embodiment.
Figure 22:
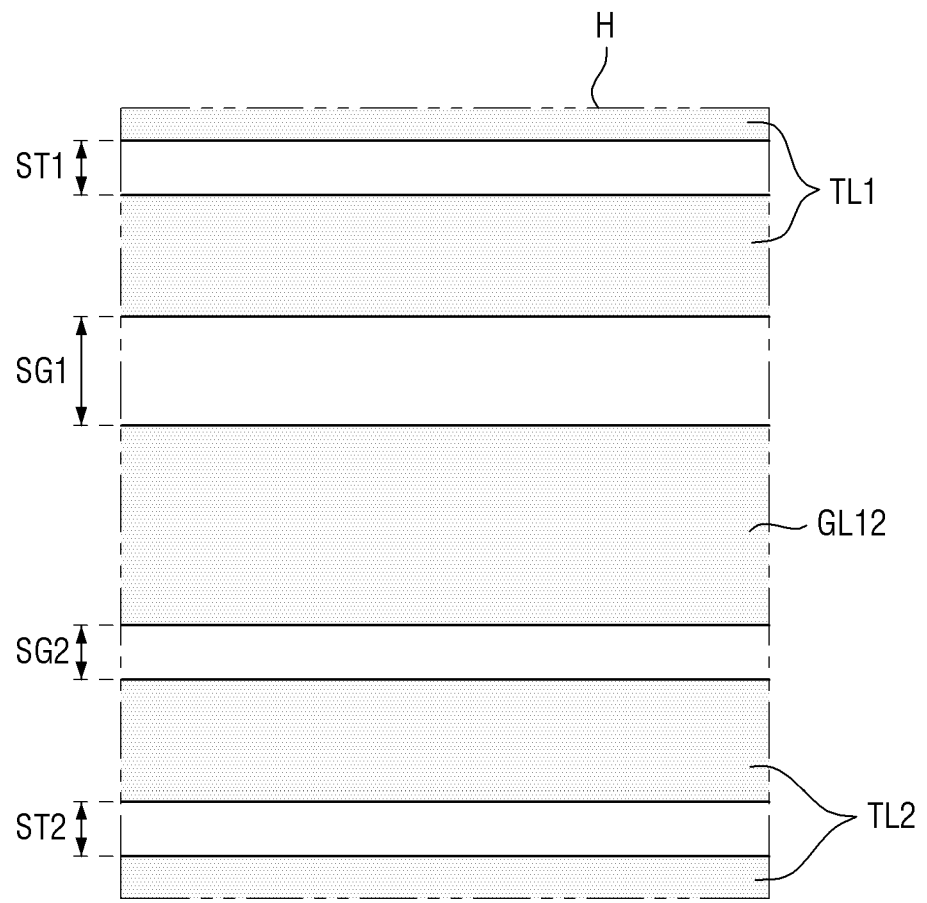
FIG. 22 is an enlarged view of area H of FIG. 21 according to an exemplary embodiment.
Figure 23:
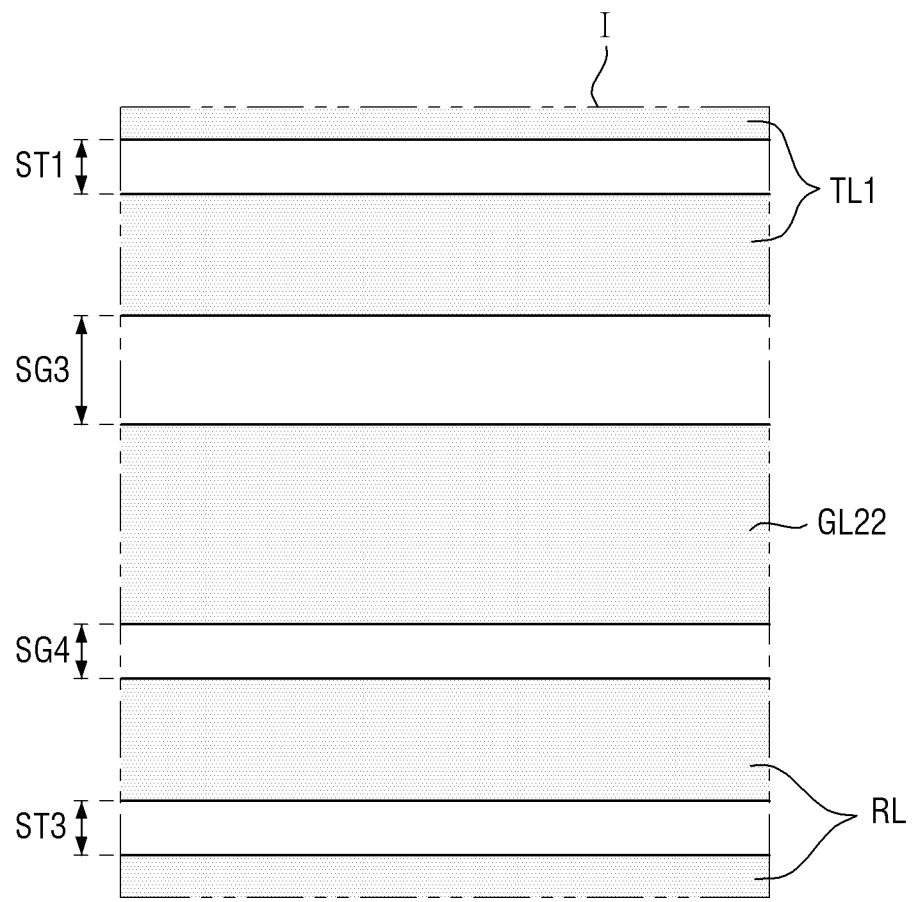
FIG. 23 is an enlarged view of area I of FIG. 21 according to an exemplary embodiment.

FIG. 21 is a plan view of a display device according to an exemplary embodiment. FIG. 22 is an enlarged view of area H of FIG. 21 according to an exemplary embodiment. FIG. 23 is an enlarged view of area I of FIG. 21 according to an exemplary embodiment.

Referring to FIGS. 21 to 23, the display device is different from that of the exemplary embodiments of FIGS. 1 to 17 in that the distance between the guard line GL1 and the first routing line TL1 and the distance between the guard line GL2 and the first routing line TL1 are different from those of FIGS. 1 to 17.

For instance, the distance SG1 between the second region GL12 of the first guard line GL1 and the first routing line TL1 adjacent thereto may be different from the distance SG2 between the second region GL12 of the first guard line GL1 and the second routing line TL2 adjacent thereto. For example, the distance SG1 between the second region GL12 of the first guard line GL1 and the first routing line TL1 adjacent thereto may be greater than the distance SG2 between the second region GL12 of the first guard line GL1 and the second routing line TL2 adjacent thereto. For example, the distance SG1 between the second region GL12 of the first guard line GL1 and the first routing line TL1 adjacent thereto may be 8 and the distance SG2 between the second region GL12 of the first guard line GL1 and the second routing line TL2 adjacent thereto may be 4 but exemplary embodiments are not limited thereto.

Further, the distance SG1 between the second region GL12 of the first guard line GL1 and the first routing line TL1 adjacent thereto may be different from the distance ST1 between the plurality of first routing lines TL1. For example, the distance SG1 between the second region GL12 of the first guard line GL1 and the first routing line TL1 adjacent thereto may be greater than the distance ST1 between the plurality of first routing lines TL1. For example, the distance SG1 between the second region GL12 of the first guard line GL1 and the first routing line TL1 adjacent thereto may be 8 and the distance ST1 between the plurality of first routing lines TL1 may be 4 but exemplary embodiments are not limited thereto.

Further, the distance SG1 between the second region GL12 of the first guard line GL1 and the first routing line TL1 adjacent thereto may be different from the distance ST2 between the plurality of second routing lines TL2. For example, the distance SG1 between the second region GL12 of the first guard line GL1 and the first routing line TL1 adjacent thereto may be greater than the distance ST2 between the plurality of second routing lines TL2. For example, the distance SG1 between the second region GL12 of the first guard line GL1 and the first routing line TL1 adjacent thereto may be 8 and the distance ST2 between the plurality of second routing lines TL2 may be 4 but exemplary embodiments are not limited thereto.

The distance SG3 between the second region GL22 of the second guard line GL2 and the first routing line TL1 adjacent thereto may be different from the distance SG4 between the second region GL22 of the second guard line GL2 and the third routing line RL adjacent thereto. For example, the distance SG3 between the second region GL22 of the second guard line GL2 and the first routing line TL1 adjacent thereto may be greater than the distance SG4 between the second region GL22 of the second guard line GL2 and the third routing line RL adjacent thereto. For example, the distance SG3 between the second region GL22 of the second guard line GL2 and the first routing line TL1 adjacent thereto may be 8 and the distance SG4 between the second region GL22 of the second guard line GL2 and the third routing line RL adjacent thereto may be 4 but exemplary embodiments are not limited thereto.

Further, the distance SG3 between the second region GL22 of the second guard line GL2 and the first routing line TL1 adjacent thereto may be different from the distance ST1 between the plurality of first routing lines TL1. For example, the distance SG3 between the second region GL22 of the second guard line GL2 and the first routing line TL1 adjacent thereto may be greater than the distance ST1 between the plurality of first routing lines TL1. For example, the distance SG3 between the second region GL22 of the second guard line GL2 and the first routing line TL1 adjacent thereto may be 8 and the distance ST1 between the plurality of first routing lines TL1 may be 4 but exemplary embodiments are not limited thereto.

Further, the distance SG3 between the second region GL22 of the second guard line GL2 and the first routing line TL1 adjacent thereto may be different from the distance ST2 between the plurality of second routing lines TL2. For example, the distance SG3 between the second region GL22 of the second guard line GL2 and the first routing line TL1 adjacent thereto may be greater than the distance ST2 between the plurality of second routing lines TL2. For example, the distance SG3 between the second region GL22 of the second guard line GL2 and the first routing line TL1 adjacent thereto may be 8 and the distance ST2 between the plurality of second routing lines TL2 may be 4 but exemplary embodiments are not limited thereto.

As described above, when the distance between the first guard line GL1 and the first routing line TL1 and the distance between the second guard line GL2 and the first routing line TL1 increase, electrostatic defects due to a difference in area (or length) between each of the guard lines GL1 and GL2 and the first routing line TL1 can be prevented or mitigated.

Figure 24:
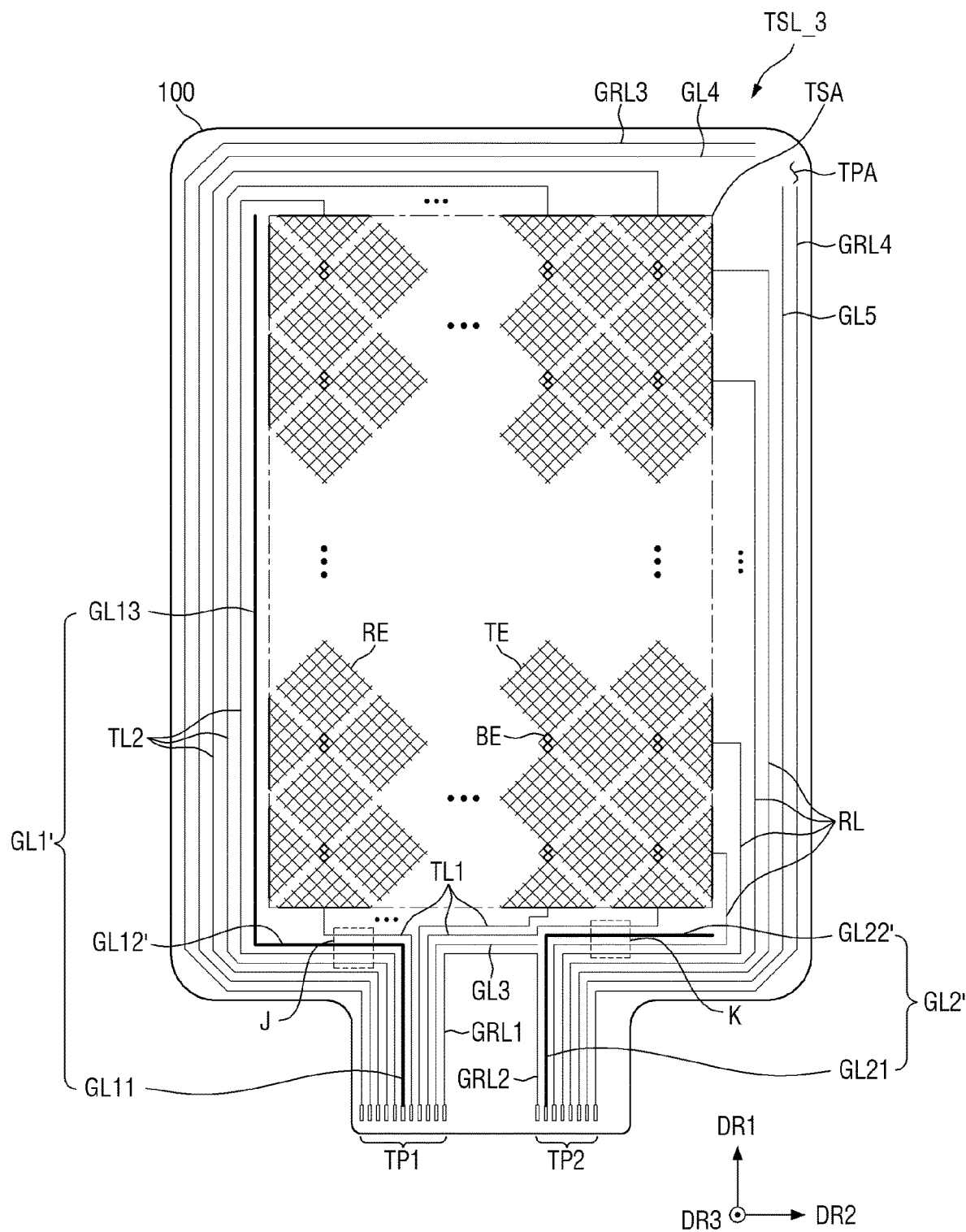
FIG. 24 is a plan view of a display device according to an exemplary embodiment.
Figure 25:
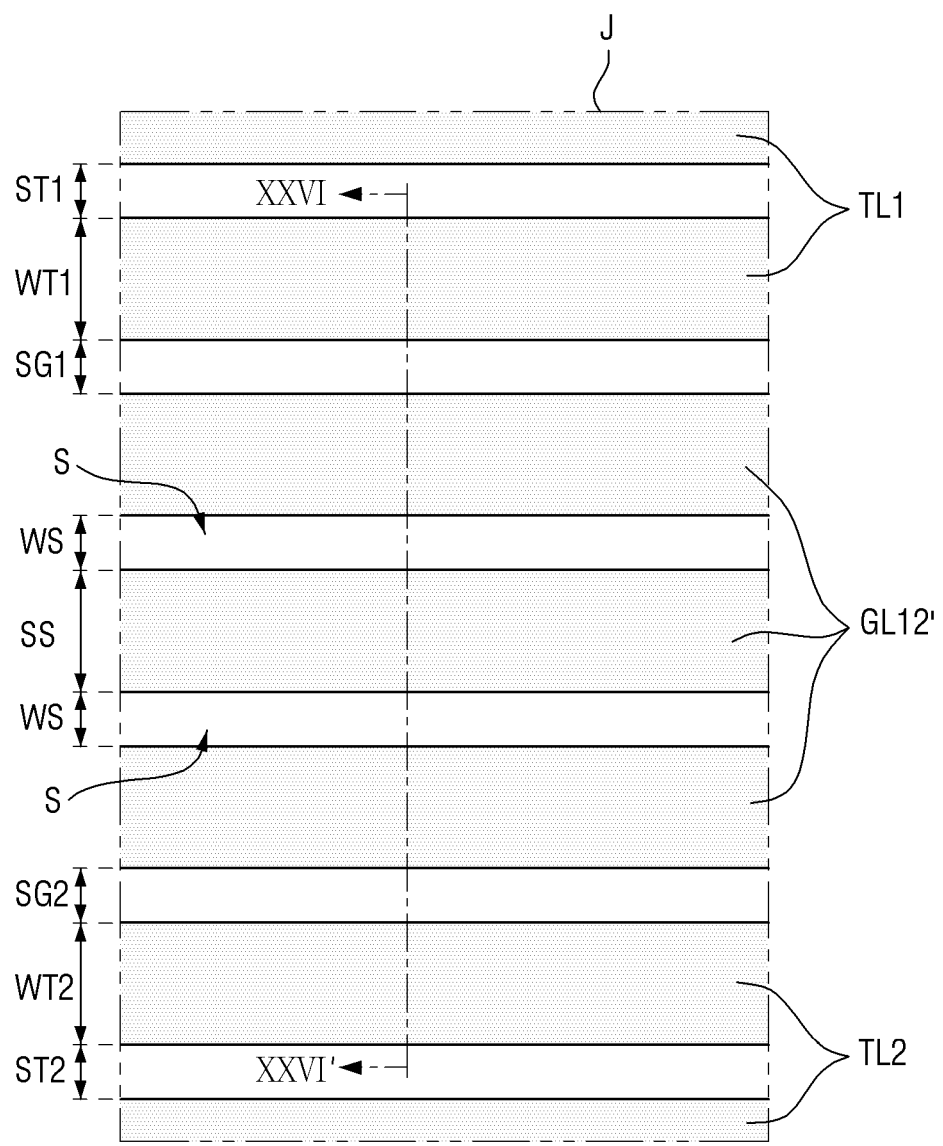
FIG. 25 is an enlarged view of area J of FIG. 24 according to an exemplary embodiment.
Figure 26:
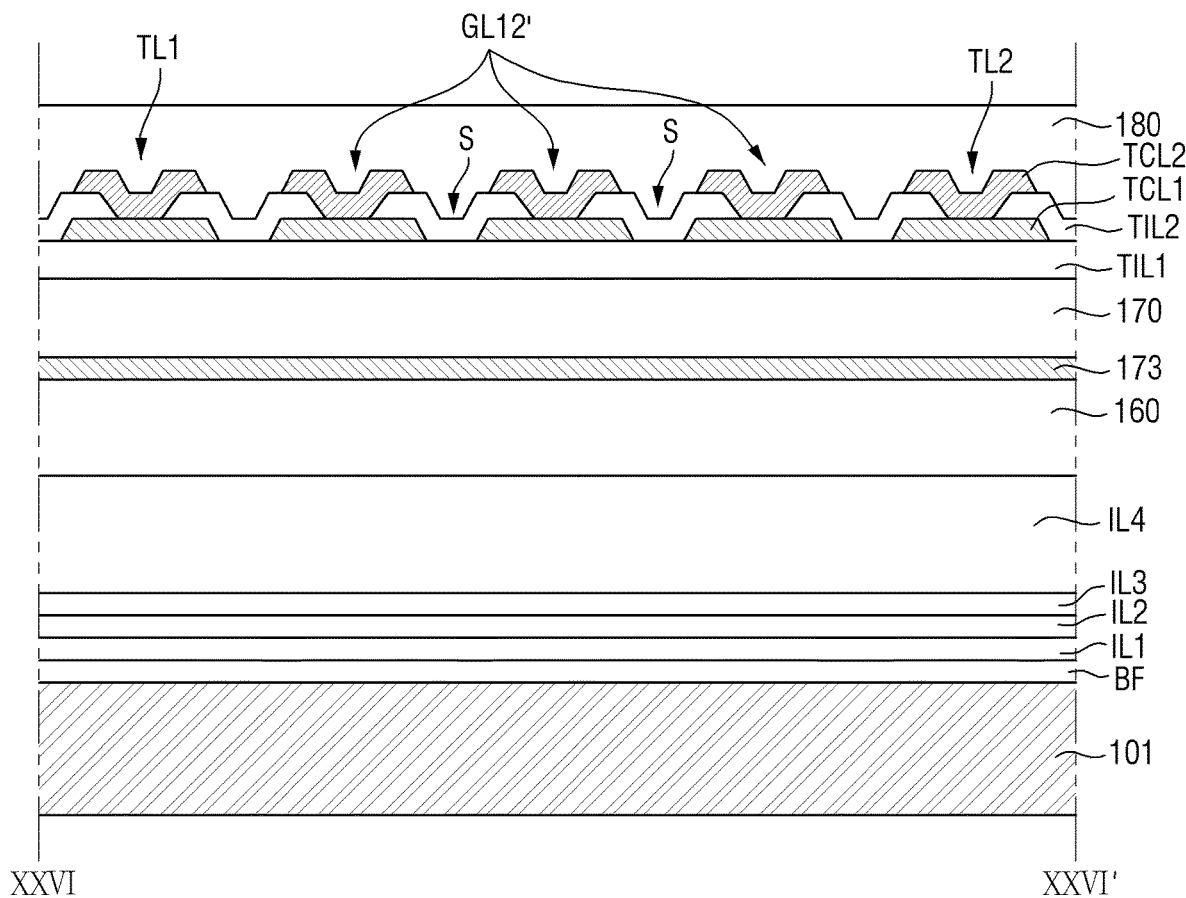
FIG. 26 is a cross-sectional view taken along sectional line XXVI-XXVI' of FIG. 25 according to an exemplary embodiment.
Figure 27:
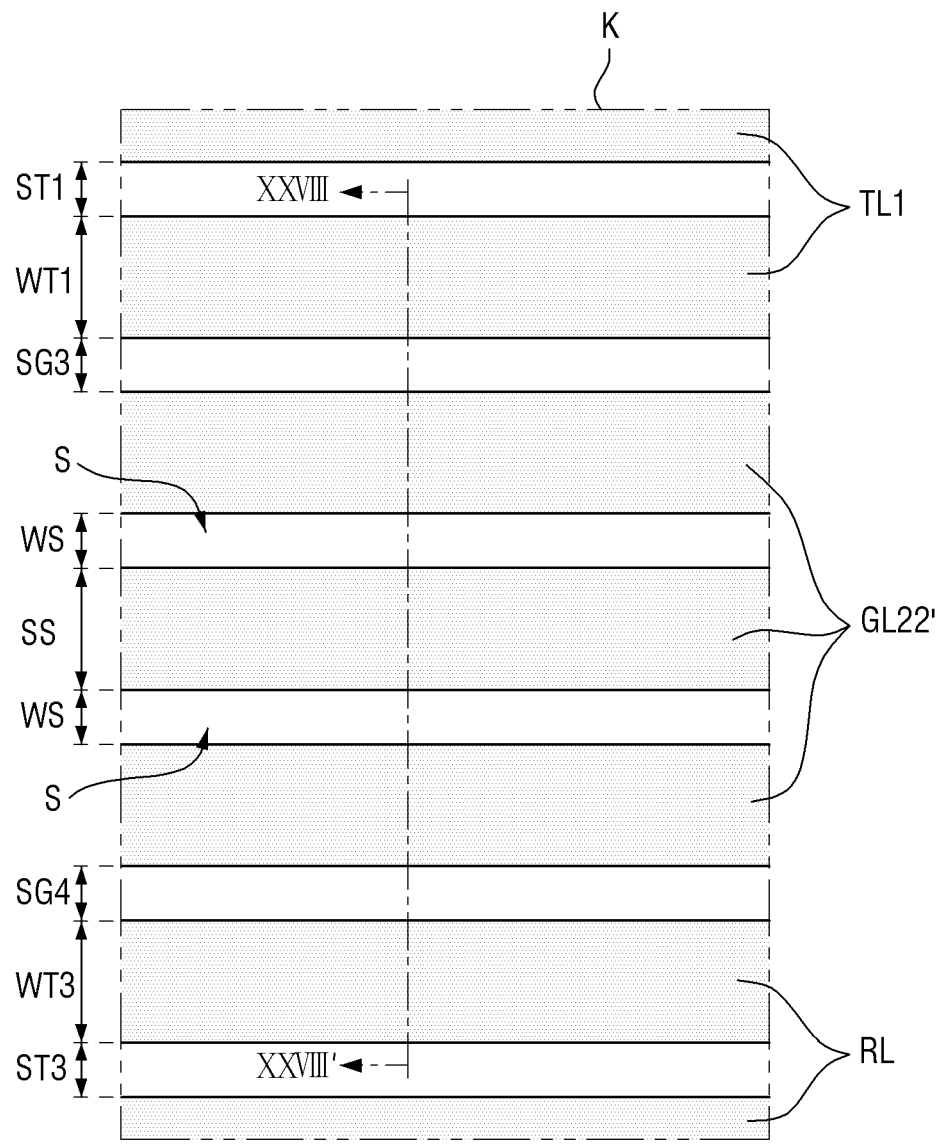
FIG. 27 is an enlarged view of area K of FIG. 24 according to an exemplary embodiment.
Figure 28:
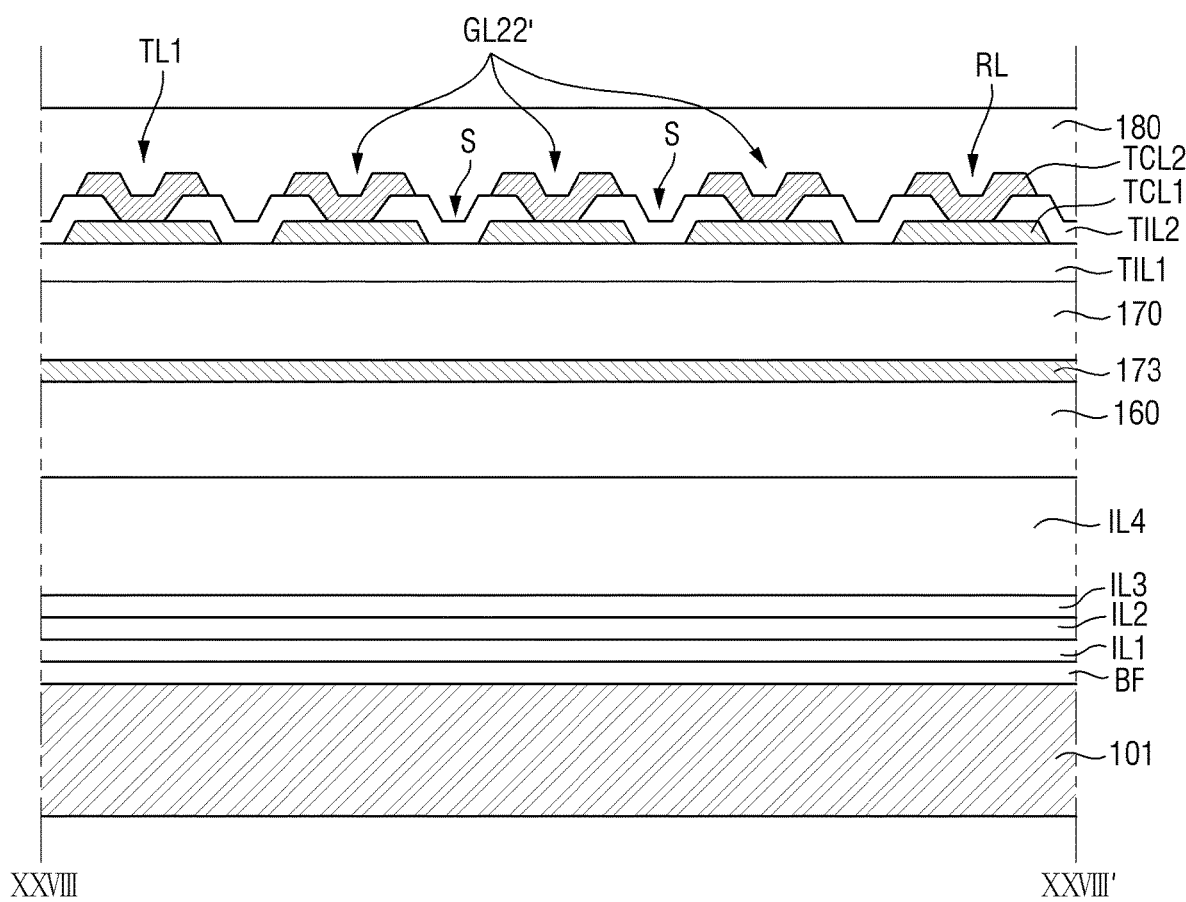
FIG. 28 is a cross-sectional view taken along sectional line XXVIII-XXVIII' of FIG. 27.

FIG. 24 is a plan view of a display device according to an exemplary embodiment. FIG. 25 is an enlarged view of area J of FIG. 24 according to an exemplary embodiment. FIG. 26 is a cross-sectional view taken along sectional line XXVI-XXVI' of FIG. 25 according to an exemplary embodiment. FIG. 27 is an enlarged view of area K of FIG. 24 according to an exemplary embodiment. FIG. 28 is a cross-sectional view taken along sectional line XXVIII-XXVIII' of FIG. 27 according to an exemplary embodiment.

Referring to FIGS. 24 to 28, the display device is different from that of the exemplary embodiments of FIGS. 1 to 17 in that each of guard lines GL1' and GL2' of a touch sensing layer TSL_3 includes at least one slit S.

For instance, each of the second region GL12' of the first guard line GL1' and the second region GL22' of the second guard line GL2' may include at least one slit S. When each of the second regions GL12' and GL22' of the guard lines GL1' and GL2' includes at least one slit S, a difference in area (e.g., length) between each of the guard lines GL1' and GL2' and the first routing line TL1 adjacent thereto may be decreased. Accordingly, electrostatic effects due to a difference in area (e.g., length) between wirings can be prevented or mitigated.

The extending direction of the slit S may be the same as the extending direction of the guard lines GL1' and GL2'. For instance, the extending direction of the slit S may be the second direction DR2, which is the extending direction of the second regions GL12' and GL22' of the guard lines GL1' and GL2'.

The width WS of the slit S may be substantially equal to the distance ST1 between the plurality of first routing lines TL1. Further, the width WS of the slit S may be substantially equal to the distance ST2 between the plurality of second routing lines TL2. Further, the width WS of the slit S may be substantially equal to the distance ST3 between the plurality of third routing lines RL.

Further, the width WS of the slit S may be substantially equal to the distance SG1 between the second region GL12' of the first guard line GL1' and the first routing line TL1 adjacent thereto. Further, the width WS of the slit S may be substantially equal to the distance SG2 between the second region GL12' of the first guard line GL1' and the second routing line TL2 adjacent thereto. Further, the width WS of the slit S may be substantially equal to the distance SG3 between the second region GL22' of the second guard line GL2' and the first routing line TL1 adjacent thereto. Further, the width WS of the slit S may be substantially equal to the distance SG4 between the second region GL22' of the second guard line GL2' and the third routing line RL adjacent thereto.

The distance SS between the plurality of slits S may be substantially equal to the width WT1 of the first routing line TL1. Further, the distance SS between the plurality of slits S may be substantially equal to the width WT2 of the second routing line TL2. Further, the distance SS between the plurality of slits S may be substantially equal to the width WT3 of the third routing line RL.

The slit S may penetrate the guard lines GL1' and GL2' in the thickness direction, e.g., in the third direction DR3. For example, as shown in FIGS. 26 and 28, the guard lines GL1' and GL2' include a first touch conductive layer TCL1 and a second touch conductive layer TCL2, and the second touch conductive layer TCL2 may be electrically connected to the first touch conductive layer TCL1 through a contact hole penetrating the second touch insulating layer TIL2. In this case, in the area where the slit S of the guard lines GL1' and GL2' are defined, the first touch conductive layer TCL1 and the second touch conductive layer TCL2 may be partially removed. For example, the slits S of the guard lines GL1' and GL2' may not overlap the first touch conductive layer TCL1 and the second touch conductive layer TCL2. In this case, one surface of the second touch insulating layer TIL2 may be in direct contact with the first touch insulating layer TIL1 and the other surface of the second touch insulating layer TIL2 may be in direct contact with the touch protection layer 180.

As described above, when the width WS of the slit S is substantially equal to each of the distances ST1, ST2, and ST3 between routing lines TL1, TL2, and RL and the distances SS between the plurality of slits S are substantially equal to the widths WT1 and WT2 of the routing lines TL1 and TL2, a phenomenon in which wirings are visually recognized due to differences in width and distance between the guard lines GL1' and GL2' and the routing lines TL1, TL2, and RL can be prevented or mitigated.

Meanwhile, although it is illustrated in FIGS. 25 and 26 that the second regions GL12' and GL22' of the guard lines GL1' and GL2' include the slits S, exemplary embodiments are not limited thereto. That is, the first regions GL11 and GL21 and/or the third regions GL13 and GL23 of the guard lines GL1' and GL2' may also include the slits S.

According to various exemplary embodiments, a portion of a guard line of a touch sensing layer may be formed as a single conductive layer to prevent (or mitigate) electrostatic defects of the guard line. Further, the distance between the guard line and a routing line adjacent thereto or an area of the guard line may be adjusted to prevent (or mitigate) electrostatic defects of the guard line. It is noted, however, that the effects of the inventive concepts are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device, comprising:
   first touch electrodes arranged in a touch sensing area, each of the first touch electrodes comprising a first side and a second side opposite to the first side;
   first routing lines connected to the first sides of the first touch electrodes;
   second routing lines connected to the second sides of the first touch electrodes; and
   a first guard line comprising a first region extending in a first direction and a second region extending from one end of the first region in a second direction crossing the first direction,
   wherein the first region of the first guard line is between the first routing lines and the second routing lines such that each of the first routing lines are disposed at a first side of the first region of the first guard line and each of the second routing lines are disposed at a second side of the first region of the first guard line in the second direction,
   wherein the second region of the first guard line is between the first routing lines and the second routing lines such that each of the first routing lines are disposed at a first side of the second region of the first guard line and each of the second routing lines are disposed at a second side of the second region of the first guard line in the first direction,
   wherein the first routing lines and the second routing lines are connected to a different pad, respectively,
   wherein the first region of the first guard line comprises:
      a first touch conductive layer; and
      a second touch conductive layer on the first touch conductive layer, and
   wherein the second region of the first guard line comprises the second touch conductive layer and does not overlap the first touch conductive layer in a third direction perpendicular to the first and second directions.

2. The display device of claim 1, further comprising:
   a touch insulating layer between the first touch conductive layer and the second touch conductive layer,
   wherein the second touch conductive layer of the first region of the first guard line is electrically connected to the first touch conductive layer of the first region of the first guard line through a contact hole penetrating the touch insulating layer.

3. The display device of claim 1, further comprising:
   touch electrode pads arranged in a touch peripheral area outside the touch sensing area,
   wherein the first region of the first guard line is electrically connected to a touch electrode pad among the touch electrode pads.

4. The display device of claim 3, wherein:
   the first guard line further comprises a third region extending from one end of the second region in the first direction; and
   the third region of the first guard line comprises the second touch conductive layer and does not overlap the first touch conductive layer in the third direction.

5. The display device of claim 1, wherein:
   the first guard line comprises slits; and
   each of the slits penetrates the first guard line in the third direction.

6. The display device of claim 1, further comprising:
   second touch electrodes spaced apart from the first touch electrodes;
   third routing lines connected to the second touch electrodes; and
   a second guard line between the first routing lines and the third routing lines,
   wherein the second guard line comprises:
      a first region extending in the first direction; and
      a second region extending in the second direction,
   wherein the first region of the second guard line comprises the first touch conductive layer and the second touch conductive layer, and
   wherein the second region of the second guard line comprises the second touch conductive layer and does not overlap the first touch conductive layer in the third direction.

7. The display device of claim 6, further comprising:
   touch electrode pads arranged in a touch peripheral area outside the touch sensing area,
   wherein:
      the first region of the first guard line is connected to a first touch electrode pad among the touch electrode pads; and
      the first region of the second guard line is connected to a second touch electrode pad among the touch electrode pads.

8. The touch sensor of claim 6, wherein:
   at least one of the first guard line and the second guard line comprises slits; and
   each of the slits penetrates the at least one of the first guard line and the second guard line in the third direction.

9. A display device, comprising:
   first touch electrodes arranged in a touch sensing area, each of the first touch electrodes comprising a first side and a second side;
   first routing lines connected to the first sides of the first touch electrodes;
   second routing lines connected to the second sides of the first touch electrodes;
   a first guard line between the first routing lines and the second routing lines; and
   touch electrode pads arranged in a touch peripheral area outside the touch sensing area,
   wherein the first guard line comprises:
      a first region extending in a first direction; and
      a second region extending from one end of the first region in a second direction crossing the first direction,
   wherein the first region of the first guard line comprises:
      a first touch conductive layer; and
      a second touch conductive layer on the first touch conductive layer,
   wherein the first region of the first guard line is electrically connected to a touch electrode pad among the touch electrode pads,
   wherein the second region of the first guard line comprises the second touch conductive layer and does not overlap the first touch conductive layer in a third direction perpendicular to the first and second directions, and
   wherein:
      the first guard line further comprises a third region extending from one end of the second region in the first direction; and the third region of the first guard line comprises the first touch conductive layer and the second touch conductive layer.

10. A display device, comprising:
first touch electrodes arranged in a touch sensing area, each of the first touch electrodes comprising a first side and a second side opposite to the first side;
first routing lines connected to the first sides of the first touch electrodes;
second routing lines connected to the second sides of the first touch electrodes; and
a first guard line between the first routing lines and the second routing lines such that each of the first routing lines are disposed at a first side of the first guard line and each of the second routing lines are disposed at a second side of the first guard line,
wherein the first guard line comprises:
a first region extending in a first direction; and
a second region extending from one end of the first region in a second direction crossing the first direction,
wherein the first region of the first guard line comprises:
a first touch conductive layer; and
a second touch conductive layer on the first touch conductive layer,
wherein the second region of the first guard line comprises the second touch conductive layer and does not overlap the first touch conductive layer in a third direction perpendicular to the first and second directions,
wherein the first guard line further comprises slits, each of the slits penetrating the first guard line in the third direction, and
wherein a width of each of the slits is substantially equal to a distance between adjacent first routing lines among the first routing lines.

11. The display device of claim 10, wherein the width of each of the slits is substantially equal to a distance between adjacent second routing lines among the second routing lines.

12. The display device of claim 11, wherein the width of each of the slits is substantially equal to a distance between the first guard line and an adjacent first routing line among the first routing lines.

13. A display device, comprising:
first touch electrodes arranged in a touch sensing area, each of the first touch electrodes comprising a first side and a second side opposite to the first side;
first routing lines connected to the first sides of the first touch electrodes;
second routing lines connected to the second sides of the first touch electrodes; and
a first guard line between the first routing lines and the second routing lines such that each of the first routing lines are disposed at a first side of the first guard line and each of the second routing lines are disposed at a second side of the first guard line;
second touch electrodes spaced apart from the first touch electrodes;
third routing lines connected to the second touch electrodes; and
a second guard line between the first routing lines and the third routing lines,
wherein the first guard line comprises:
a first region extending in a first direction; and
a second region extending from one end of the first region in a second direction crossing the first direction,
wherein the first region of the first guard line comprises:
a first touch conductive layer; and
a second touch conductive layer on the first touch conductive layer,
wherein the second region of the first guard line comprises the second touch conductive layer and does not overlap the first touch conductive layer in a third direction perpendicular to the first and second directions,
wherein the second guard line comprises:
a first region extending in the first direction; and
a second region extending in the second direction,
wherein the first region of the second guard line comprises the first touch conductive layer and the second touch conductive layer,
wherein the second region of the second guard line comprises the second touch conductive layer and does not overlap the first touch conductive layer in the third direction,
wherein at least one of the first guard line and the second guard line comprises slits,
wherein each of the slits penetrates the at least one of the first guard line and the second guard line in the third direction, and
wherein a width of each of the slits is substantially equal to a distance between adjacent first routing lines among the first routing lines.

14. The display device of claim 13, wherein the width of each of the slits is substantially equal to a distance between the second guard line and an adjacent first routing line among the first routing lines.

* * * * *